United States Patent
Masini et al.

(10) Patent No.: US 9,674,740 B2
(45) Date of Patent: Jun. 6, 2017

(54) METHOD AND ARRANGEMENT FOR MOBILITY PROCEDURES SUPPORTING USER EQUIPMENT GROUPS

(71) Applicant: Telefonaktiebolaget L M Ericsson (publ), Stockholm (SE)

(72) Inventors: Gino Luca Masini, Stockholm (SE); Angelo Centonza, Winchester (GB); Mojgan Fadaki, Solna (SE); Fredrik Gunnarsson, Linköping (SE); Gunnar Mildh, Sollentuna (SE); Oumer Teyeb, Solna (SE); Stefan Wager, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/416,288

(22) PCT Filed: Jun. 3, 2013

(86) PCT No.: PCT/EP2013/061369
§ 371 (c)(1),
(2) Date: Jan. 22, 2015

(87) PCT Pub. No.: WO2014/019740
PCT Pub. Date: Feb. 6, 2014

(65) Prior Publication Data
US 2015/0181481 A1    Jun. 25, 2015

Related U.S. Application Data

(60) Provisional application No. 61/679,253, filed on Aug. 3, 2012.

(51) Int. Cl.
*H04W 36/00* (2009.01)
*H04W 36/32* (2009.01)

(52) U.S. Cl.
CPC ....... *H04W 36/0083* (2013.01); *H04W 36/32* (2013.01); *H04W 36/0055* (2013.01)

(58) Field of Classification Search
CPC ................................................. H04W 36/0083
See application file for complete search history.

(56) References Cited

U.S. PATENT DOCUMENTS

| 6,873,852 B2 | 3/2005 | Koorapaty et al. |
| 2009/0005045 A1 | 1/2009 | Kuriki et al. |

(Continued)

FOREIGN PATENT DOCUMENTS

| EP | 1401229 A1 | 3/2004 |
| EP | 1860904 A1 | 11/2007 |

(Continued)

*Primary Examiner* — Idowu O Osifade
(74) *Attorney, Agent, or Firm* — Coats and Bennett, PLLC

(57) ABSTRACT

Cooperating nodes, and methods therein, for mobility procedures in a wireless communication system supporting UE groups. One of the cooperating nodes is a base station being associated with a UE group comprising UEs having correlated mobility related parameters. The method in the base station comprises receiving, from a first UE in the UE group, a mobility related parameter associated with the first UE. The method further comprises determining whether to initiate a mobility related procedure for a second UE in the UE group based on the received mobility related parameter; and further comprises initiating the mobility related procedure for the second UE when it is determined that the mobility related procedure is to be performed. Thereby, prediction and decisions related to mobility events, e.g. handover events, for the second UE or for the whole group may be performed e.g. before or without receiving any mobility information related to the second UE, thereby enabling early prediction and better preparation, which can lead to more robust mobility procedures.

19 Claims, 15 Drawing Sheets

(56) References Cited

U.S. PATENT DOCUMENTS

2010/0144354 A1    6/2010  Ho et al.
2011/0244870 A1*  10/2011  Lee ..................... H04W 52/244
                                                                           455/444
2012/0302240 A1*  11/2012  Tamaki ............. H04W 36/0016
                                                                           455/436
2013/0183973 A1*   7/2013  Amerga ............ H04W 36/0083
                                                                           455/436

FOREIGN PATENT DOCUMENTS

WO          9742779 A1    11/1997
WO     2009155992 A1    12/2009

* cited by examiner

METHOD AND ARRANGEMENT FOR MOBILITY PROCEDURES SUPPORTING USER EQUIPMENT GROUPS

TECHNICAL FIELD

The present application relates generally to mobility procedures, and in particular to a method and arrangement for managing user equipment (UE) groups.

BACKGROUND

In wireless communications systems, a UE produces measurement reports to be provided to a base station (BS), such as an eNB or NodeB. Such measurement reports may comprise e.g. information related to a signal strength of signals received from the BS and/or from neighbor cells. The UE sends its measurement reports to the BS to allow the BS to make mobility, e.g. handover, decisions for the UE. When a handover is needed, signaling between a source BS and a target BS and resource allocation at the target BS are carried out.

The more UEs there are in a wireless communication system and the higher mobility of the UEs in the wireless communication system, the more mobility related procedures and signaling must be performed by the BSs in the system. When a BS is not able to handle all mobility related procedures in a cell in time, this may result e.g. in dropped calls or other negative user experiences for users moving into or out of the cell.

SUMMARY

The present document discloses a method and apparatus for improving handover performance for a group of UEs that are identified as having similar, correlated, mobility patterns. Similar mobility patterns may include geographical proximity and/or similar speed and direction shared among a plurality of UEs. UEs exhibiting similar mobility behaviors can be grouped together. The use of such groups of UEs sharing common mobility patterns allows prediction of and preparation for mobility events, e.g. handover events, for the whole group or part of the group. Early prediction and better preparation can lead to more robust mobility procedures.

According to a first aspect, a method is provided, to be performed by base station, such as an eNB, in a wireless communication system. The base station is associated with a UE group comprising UEs having correlated mobility related parameters. The method comprises receiving, from a first UE in the UE group, a mobility related parameter associated with the first UE. The method further comprises determining whether to initiate a mobility related procedure for a second UE in the UE group, based on the received mobility related parameter. The method further comprises initiating the mobility related procedure for the second UE when it is determined that the mobility related procedure is to be performed.

According to a second aspect, a method is provided, to be performed by a network node associated with a handover of a plurality of UEs in a UE group to a target node. The method comprises receiving information indicating that the plurality of UEs being subjected to the handover have connected to the target node; and transmitting a single path switch request or a single modify bearer request for the plurality of UEs.

According to a third aspect, a base station is provided, which is operable in a wireless communication system. The base station is adapted to perform the method according to the first aspect above. The base station comprises a receiving unit, adapted to receive, from a first UE in the UE group, a mobility related parameter associated with the first UE. The base station further comprises a determining unit, adapted to determine whether to initiate a mobility related procedure for a second UE in the UE group based on the received mobility related parameter; and further comprises a mobility control unit, adapted to initiate the mobility related procedure for the second UE when it is determined that the mobility related procedure is to be performed.

According to a fourth aspect, a network node is provided, which is operable in a communication system. The network node is adapted to perform the method according to the second aspect. The network node comprises a receiving unit, adapted to receive information indicating that the plurality of UEs being subjected to the handover have connected to a target node. The network node further comprises a control unit, adapted to transmit a single path switch request or a single modify bearer request for the plurality of the UEs in the UE group being subjected to the handover.

According to a fifth aspect, a computer program is provided, comprising computer readable code means, which when run in a network node according to the third or fourth aspect causes the network node to perform the method according to the first or second aspect, respectively.

According to a sixth aspect, a computer program product is provided, comprising a computer program according to the fifth aspect.

BRIEF DESCRIPTION OF THE DRAWINGS

The solution disclosed herein will now be described in more detail by means of exemplifying embodiments and with reference to the accompanying drawings, in which.

DETAILED DESCRIPTION

In current wireless communications systems, UEs are usually managed individually. Each mobility event of a UE is handled independently from mobility events associated with other UEs. For example, during a handover situation, a UE performs measurement reports independently of other UEs. Each UE sends its measurement reports to a base station (BS), such as an eNB or NodeB, to allow the BS to make handover decisions for that particular UE. Signaling between a source BS and a target BS and resource allocation at the target BS are also carried out on a per UE basis.

Managing UEs individually during a handover entails that the network individually evaluates the condition for each UE and executes handovers for every terminal. If a large number of UEs are moving as a group at a high speed, a large number of handovers may need to be executed within a very short time period. This may lead to delays in the execution of handovers and potentially failures due to a high number of handovers, and lack of anticipated handover preparation.

UEs are usually individually monitored. Current solutions lack means to deduce common mobility behaviors shared among different UEs from events or trend information monitored for each individual.

Current mobility procedures do not rely on common mobility behaviors shared by a plurality of UEs, and therefore handle mobility events for each UE separately. There is a need for enhanced mobility procedures that can take advantage of the common mobility behaviors identified for a group of UEs. Methods and apparatuses for enabling such enhanced mobility procedures are provided by the herein suggested solution.

In the following paragraphs, different aspects of the disclosed solution will be described in more detail with references to certain embodiments of the disclosed solution and to accompanying drawings. For purposes of explanation and not limitation, specific details are set forth, such as particular scenarios and techniques, in order to provide a thorough understanding of the different embodiments. However, other embodiments may depart from these specific details. Further information on some of the mobility related parameters discussed herein, and their use, can be found in an appendix to the detailed description. It has been placed at the end of the detailed description in order not to obscure the understanding of the herein suggested solution.

Exemplifying embodiments of a method performed by a base station, such as an eNB, in a wireless communication system will now be described with reference to FIG. 1. The base station is associated with a UE group comprising UEs having correlated mobility related parameters. Such a UE group could also be denoted e.g. a "UE mobility group" or "mobility group". The creation of such a UE group is not the focus of this disclosure, but is described in a related non-published application. The creation of such a UE group will also be described further below.

Figure 1:
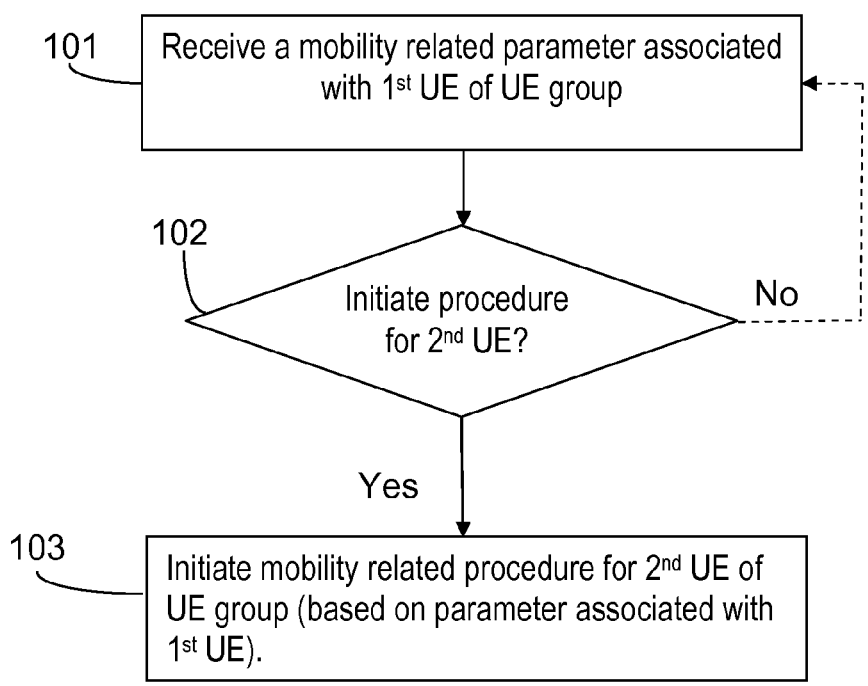
FIGS. 1-3 are flow charts illustrating procedures, according to exemplifying embodiments in different nodes.

FIG. 1, illustrates the method comprising receiving 101, from a first UE in the UE group, a mobility related parameter associated with the first UE. The method further comprises determining 102 whether to initiate a mobility related procedure for a second UE in the UE group, based on the received mobility related parameter. The method further comprises initiating 103 the mobility related procedure for the second UE when it is determined that the mobility related procedure is to be performed.

The base station receives a mobility related parameter, or information on said parameter, from a UE in the UE group. It is assumed to be clearly defined which UEs that belong to the group, so this is known to the base station. The mobility related parameter may be a number of different parameters, which will be further described below.

The determining of whether to initiate a mobility related procedure for a second UE in the UE group is based on the received mobility related parameter, which is associated with a first UE in the UE group, which may appear illogical. However, this is a special point of the method, that a conclusion may be drawn for a second UE based on information related to another, first, UE. In the prior art, all mobility decisions for a UE are based on information from and about the UE itself. In this case, however, it is based on information associated with another UE in the UE group. This is possible due to the properties of the group, which will be described further below.

Thus, when it is determined that the mobility related procedure is to be initiated for the second UE, said mobility related procedure is initiated for the second UE, in accordance with a procedure therefore. Examples of mobility related procedures will be given further below.

The method enables e.g. prediction of, and preparation for, mobility related procedures for a UE, even when no, or insufficient, information is received or retrieved from said UE. The method enables making fast decisions.

The determining of whether to initiate a mobility related procedure for a second UE may comprise determining whether to initiate a mobility related procedure for the first UE based on the received mobility related parameter, and applying the result on the second UE, which belongs to the same UE group as the first UE.

The determining of whether to initiate a mobility related procedure for the first UE may be performed according to known methods therefore. It may for example be determined whether the first UE receives a stronger signal from a neighbor base station than from the serving base station, and whether a received signal from the serving base station is strong enough according to standardized rules therefore. Based on the properties of the UE group, it may be assumed that since the first UE is in need of, or would benefit from, a certain mobility related procedure, the second UE is in need of, or would benefit from, the same mobility related procedure as the first UE. The mobility related procedure may be related e.g. to load sharing, in form of handing over a group of UEs to an adjacent cell, which has more available capacity than a serving cell.

The determining of whether or not to initiate a mobility related procedure for the first UE may be performed in accordance with an existing procedure which is already performed in a wireless system of today. However, due to that the first and the second UE belong to the same UE group, having a correlated mobility pattern, the decision may be extended to apply for the second UE. The mobility related procedure may be initiated also for the first UE, or, for a subset of the UE group or for the whole UE group, depending on how e.g. a set of rules therefore is configured.

The mobility related procedure may be e.g. a handover preparation procedure or a handover procedure. A handover preparation procedure may be initiated towards more than one target node, and does not necessarily imply that a handover, in fact, will be performed towards the target node. However, a handover preparation procedure may be regarded as a part of a handover procedure. As previously described, e.g. a handover preparation procedure may be initiated for the second UE, when the mobility related parameter associated with the first UE is indicative of that a handover would be beneficial. This implies that mobility decisions may be taken, e.g. for the whole group, as soon as mobility information related to a first UE of the group is received. Thereby, lots of signaling and time may be saved e.g. by not requesting mobility related parameters from the rest of the UEs in the group.

Figure 4:
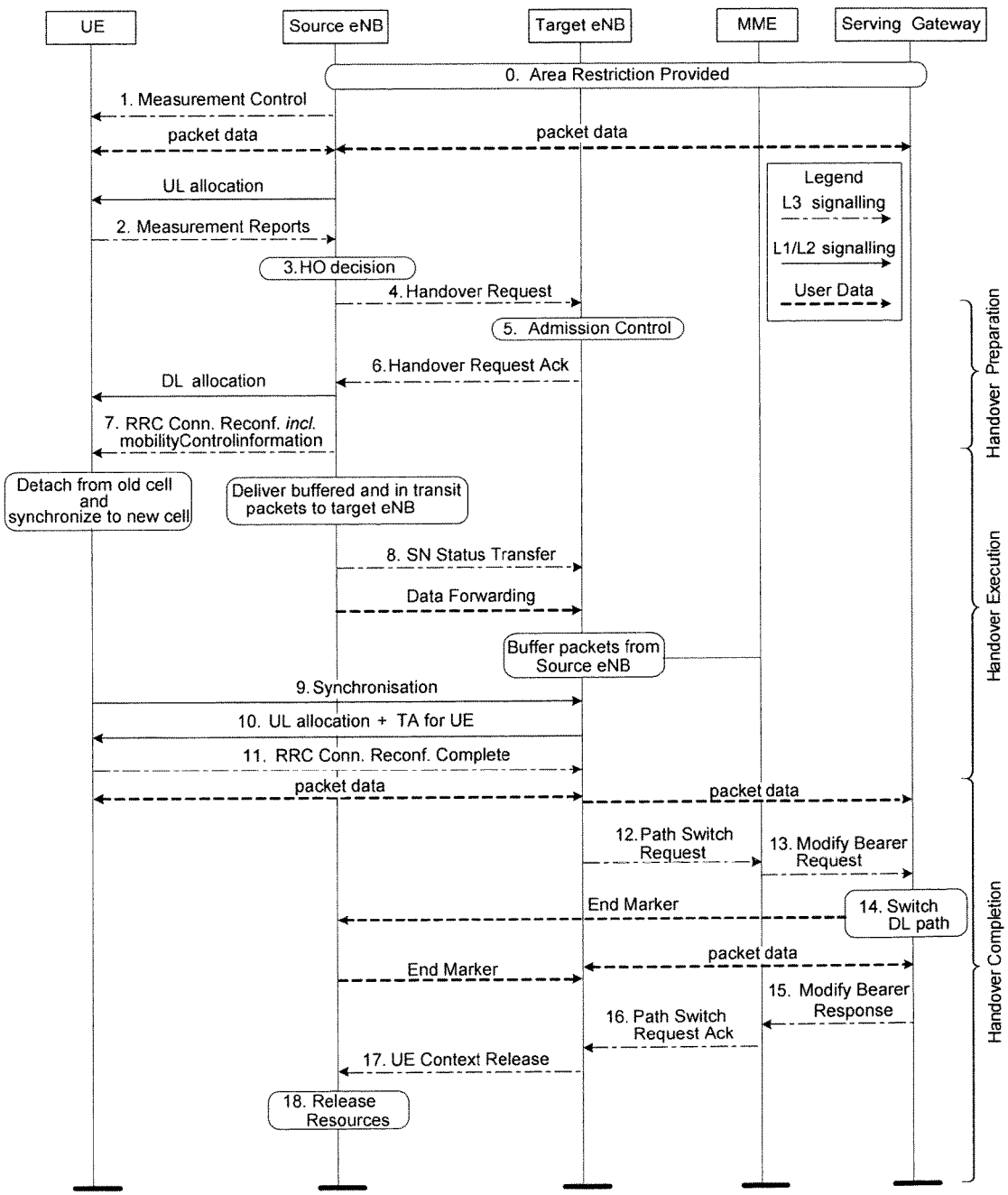
FIG. 4 illustrates signaling flows in an intra MME/S-GW handover event

The initiating of a mobility related procedure may comprise transmitting a handover request to a target network node, which is also illustrated in FIG. 4. FIG. 4 will be described in more detail further below.

The mobility related parameter may be one or more of: a report of a measured signal strength at the first UE; a report of a measurement on a signal received by the first UE from a neighboring base station; information on the geographical position of the first UE; and, a report of a measurement on a signal received by the first UE from an access point in another wireless communication system.

The report of a measured signal may be an indication e.g. of a Reference Signal Received Power (RSRP) or Reference Signal Received Quality (RSRQ). The UE may have performed measurements on signals received from the serving base station or from a neighboring base station in the wireless communication system in which the base station and UE operates, or, from an access point or base station in another wireless communication system, e.g. to which the UE could be handed over. These measurements may then be reported to the base station, which may make mobility related decisions based on the reports. Information on the UE position may be used to determine e.g. the position of the UE in relation to a number of known neighboring base stations or known sources of interference. Information on differences in geographical position between two points in time may also be used for determining whether the UE is heading towards a neighboring base station, and with which velocity. For example, it may be determined based on one or more of the mobility related parameters mentioned above whether a UE in the UE group, or the whole UE group, is moving towards a cell border, and it may further be predicted if and when the UE or UE group will need to be handed over to a neighboring cell, e.g. the one it approaches.

Further information on UE measurements may be found in the appendix to the detailed description further below.

Further, a respective mobility related parameter associated with a number of other UEs in the UE group may be received by the base station. In such a case, the initiating of the mobility related procedure may be based also on said received number of mobility related parameters.

The mobility related parameters (e.g. one per UE) associated with the number of other UEs in the UE group is received in addition to the mobility related parameter associated with the first UE. The decision is thus made based on the mobility related parameter associated with the first UE and the mobility related parameters associated with the number of UEs in the UE group. By "number of UEs" is meant one or more UEs. For example, the mobility related parameter associated with the number of UEs may relate to the received signal strength of neighboring base stations or cells.

The mobility related procedure may be initiated towards a cell, which cell is reported as being a neighbor cell by the largest number of UEs in the UE group (from which mobility related parameters have been received) or which cell is the strongest cell reported by a plurality of UEs in the UE group.

For example, the base station may wait for several UEs in the same group to report strong neighbors before initiating a preparation for handover. The base station may then perform a handover preparation for one, some, or all UEs in the UE group towards a subset of the reported neighbors. The subset may be selected based on different criteria, such as the ones listed above or below. For example, the base station can select as candidate target nodes for handover of the one or more UEs: The cell(s) reported by most UEs in the group; the strongest cell(s) reported by all or some of the UEs in the group; or a combination of the preceding two.

The mobility related procedure may be initiated for more UEs than the second UE mentioned above. The mobility related procedure may be initiated for a plurality of UEs in the UE group, said plurality comprising the second UE. The mobility related procedure may e.g. be initiated for the whole UE group based on the mobility related parameter associated with the first UE.

The initiating of the mobility related procedure may comprise use of a single mobility command for a plurality of UEs in the UE group. That is, instead of sending one mobility command for each UE which is to be e.g. handed over, i.e. a plurality of mobility commands, a single mobility command is used, which indicates the plurality of UEs for which a mobility related procedure is initiated. This is an advantage, since it saves e.g. a lot of signaling associated with the mobility related procedure, and thus a lot of capacity and time, which would otherwise have been spent on sending, receiving, interpreting and processing the more extensive signaling.

Figure 2:
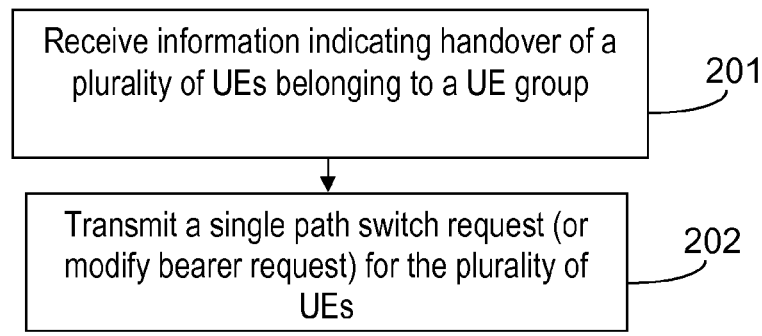

Embodiments herein also relate to a method performed by a network node associated with a handover of a plurality of UEs in a UE group to a target node. The UE group is the same type of UE group as described above, and comprises UEs having correlated mobility related parameters. Such a method will now be described with reference to FIG. 2. FIG. 2 illustrates the method comprising receiving 201 information indicating that the plurality of UEs being subjected to the handover have connected to the target node; and transmitting 202 a single path switch request or a single modify bearer request for the plurality of UEs.

The network node may be the target node, to which the plurality of UEs have connected/been handed over, or, the network node could be an MME (Mobility Management Entity). That is the reason for the transmitting of either a single path switch request or of a single modify bearer request. In case the network node is a base station, i.e. the target node, it will transmit a single path switch request to an MME. In case the network node is an MME, it will transmit a single modify bearer request e.g. to a serving gateway. This is also illustrated in FIG. 4.

In prior art, one such message, i.e. path switch request or modify bearer request, would have been transmitted for each of the plurality of UEs. By sending one single message identifying a plurality of UEs in a UE group, signaling is saved, which imply that time and resources are saved.

The received information indicating that the plurality of UEs being subjected to a handover have connected to a target node will also be different depending on whether the node is a base station or an MME. When the network node is a base station (the target node) the information may be an RRC message received from one or all of the plurality of UEs. The RRC message may be a so-called RRC Connection Reconfiguration Complete message, which is also illustrated in FIG. 4. When the network node is an MME, the information may be e.g. a message received from the target base station or the source base station.

Which type of information and signaling that is received may depend on whether there is an X2 interface configured for the source and target base stations. The nodes and messages described above are mostly denoted with LTE terminology. However, the herein suggested solution could also be applied in other types of communication systems where nodes and signaling may be denoted differently.

Embodiments herein also relate to a method performed by a UE, below denoted a first UE, comprised in a UE group as the one described above, comprising UEs having correlated mobility related parameters. The first UE is having access to a first identifier, identifying the UE group in which the first UE is comprised. By "having access to" is meant that the UE has been informed of to which UE group it belongs. This could have been indicated to the UE e.g. by the network node creating the UE group or refining the UE group, e.g. upon including the UE in the group. For example, a serving base station could signal a UE group identifier to the UE, which could be stored in a memory in the UE. This UE group identifier could thus be the first identifier mentioned above.

Figure 3:
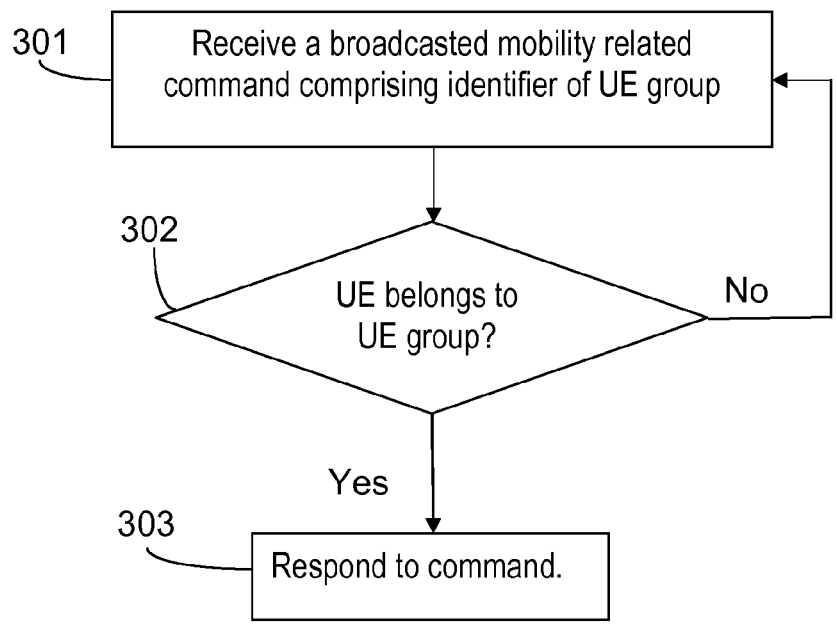

Such a method performed by a UE will now be described with reference to FIG. 3. FIG. 3 illustrates the method comprising receiving 301 a broadcasted mobility related command from a base station, said command comprising a second identifier, identifying a UE group The method further comprises determining 302, based on the first and second identifier, whether the first UE belongs to the UE group identified by the second identifier. The method further comprises responding 303 to the received command when it is determined that the first UE belongs to the UE group identified by the second identifier.

The mobility related command may be broadcasted from a serving base station or a target base station. The mobility related command may be related to handover, and be e.g. an RRC Connection Reconfiguration message. Such a command may herein be denoted e.g. "group handover command". By "target base station" may be understood a base station serving the cell indicated as target cell in the mobility related command. The command comprises a second identifier, identifying a UE group, and the command is transmitted in order to trigger a mobility related procedure for a plurality of UEs. That is, the command is transmitted in order to trigger a concerned plurality of UEs, namely UEs belonging to the identified UE group, to take action in accordance with the mobility related command. The first UE receives the broadcasted mobility related command, and thus receives the second identifier.

The second identifier may be any type of group ID, e.g. a numerical sequence. This requires that such a group ID has been assigned to the group e.g. when the group was created. It further requires that the UE has been informed of that it belongs to a group, e.g. by being provided with the group ID. Alternatively or in addition, the UE could have been assigned a group membership ID comprising e.g. the group ID and an index indicating a "group-member-number". When the first UE receives the second identifier, and this is a group ID, it may compare the second identifier to the first identifier, and determine whether there is a match, e.g. that the same numerical sequence, e.g. of a predetermined length in a predetermined position, is comprised both in the first and second identifier, or, that the first and second identifier consists of the same numerical sequence. For example, it could be determined whether a group ID-part of the first identifier corresponds to the group ID indicated by the second identifier. When it is determined that there is a match, it may be determined that the first UE belongs to the UE group which is identified by the second identifier, and it may thus be concluded that the mobility related command is intended also for the first UE.

The second identifier could alternatively identify a second UE, representing the UE group. The first UE should then determine whether it belongs to the same UE group as the identified second UE. For example, the first UE may have received information on which UEs that are comprised in the same UE group, e.g. in form of a list or record connecting a set of UEs, by some type of identifiers, to a UE group. The first UE may thus, by determining e.g. that a certain numerical or alphabetical relation is at hand between the first and second identifier, conclude that it belongs to the UE group represented by the identifier of the second UE.

That the first UE "responds to the received command" means that the first UE takes action as if the received mobility related command had been an ordinary mobility related command intended e.g. only for the first UE. If the command is related to handover, the first UE should take the action necessary for being handed over to a target cell which would also be identified in the handover command.

The method described above enables the (first) UE to respond to group mobility commands, even when it is not, as a UE individual, explicitly addressed by the mobility command. Thereby signaling may be saved, since one group command may be sent by a serving or target base station instead of a number of commands, e.g. one for each member of the group.

As previously mentioned, the first UE may be associated with an identity, e.g. a sequence number, within the UE group. Further, the mobility related command may comprise a CRNT-I assigned to a UE in the UE group identified by the second identifier. When the first UE belongs to the UE group identified by the second identifier, the first UE may determine a CRNT-I, which has been assigned to it (to the first UE), based on the identity within the UE group and the CRNT-I comprised in the mobility related command. That is, the CRNT-I assigned to the first UE, e.g. by a target base station, is implicitly signaled to the first UE by the signaling of a CRNT-I of another UE in the UE group, e.g. the UE having group membership number "1". If the first UE then has group membership number "2", it could derive its CRNT-I based on this information if the CRNT-Is have been assigned according to a set of rules, and the first UE has been instructed at some point on how to derive the CRNT-I. The above saves explicit signaling of CRNT-Is, e.g. a t handover. This will be described in more detail further below.

Herein, a method is disclosed, which is suitable for managing UEs as a mobility group to optimize network performance. The method, which may be implemented in different embodiments, enables predicting an impending handover for a UE mobility group; identifying a target node and a target cell associated with the target node and affected UEs based on the impending handover; preparing the target cell for the impending handover; and managing the affected UEs as a group during the handover.

The method may comprise determining one or more mobility measurements associated with a UE mobility group and predicting the impending handover based on the mobility measurements. An impending handover may also be predicted based load balancing between two eNBs.

The one or more mobility measurements may include measurement reports received from a subset of the UEs belonging to the UE mobility group. When measurement report(s) from a subset of the UEs belonging to the same group indicate a possible target eNB or several possible target eNBs for handover, the target eNB(s) can be prepared for the handover of the whole group, without waiting for the measurement reports from all the UEs. This provides more time for the source eNB to complete more handovers and reduces the risk of handover failures, especially in cases in which many UEs are traveling together, e.g., on board a high-speed train. This also gives more time for the target eNB(s) to allocate the resources required for the UE mobility group.

A group handover command may be issued collectively by an eNB to all UEs in the group at the same time, saving significantly on the required signaling.

Further, the common UE position and/or trajectory information of a UE mobility group may be used to predict a handover event and the likely target eNB(s) and target cell(s) for the handover event. In anticipation of the handover event, preparation for the handover of the entire group can be performed in the cell(s) of the target eNB(s) that has been determined as likely to receive the incoming UE group. This can significantly reduce the amount of handover preparation, reduce handover failures, and enable a more precise resource allocation at the target eNB(s).

A single path switch command containing the information for the entire group can be sent by a target eNB after a handover. Accordingly, a single modify bearer request containing information for the entire group may be sent by an MME.

A list of UEs included in a UE group may be signaled to the MME (Mobility Management Entity) so that the whole group can be tracked between handovers.

Figure 5:
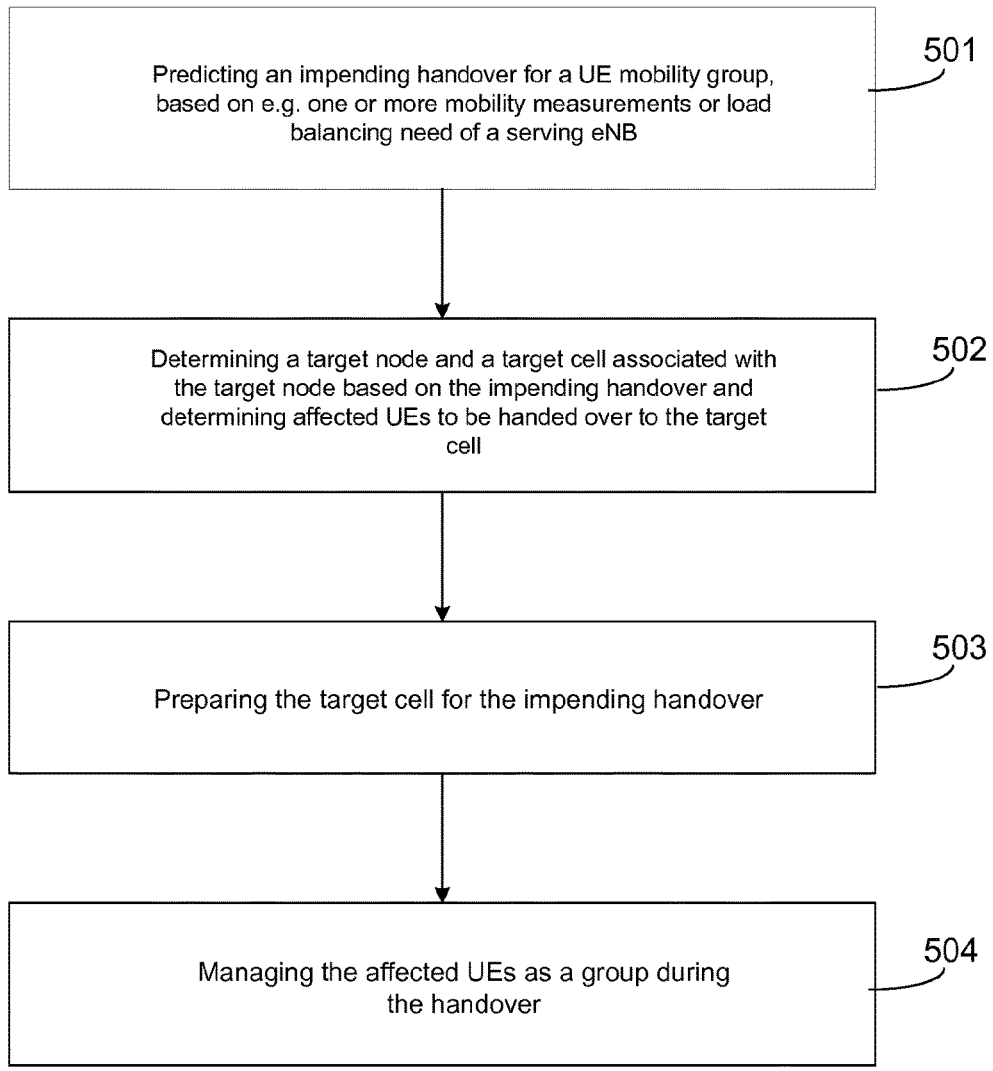
FIG. 5 is a flowchart illustrating an exemplary process of managing a UE mobility group.

FIG. 5 is a flow chart illustrating an exemplary procedure for handling a group handover. First an impending handover for a UE mobility group is predicted 501, based on, e.g. one or more mobility measurements or load balancing need of a serving eNB. Then based on the impending handover, the possible target node and target cell can be determined 502. Also the affected UEs to be handed over to the target cell can be determined as well. The target cell is then prepared 503 for the impending handover and the handover of the affected UEs is managed 504 as a group.

In the present disclosure, methods and techniques are disclosed for performing handover procedures for a UE group by relying on the common mobility behaviors of UEs belonging to a UE group. UEs belonging to an identified UE group can be managed as a group during handover, resource allocation, or other management activities. Managing multiple UEs as a group can save signaling resources, reduce operation time, and improve performance.

In the present disclosure, an LTE system is used as the exemplary radio access technology. However, the embodiments and techniques disclosed herein are equally applicable to other radio access technologies. In the present disclosure, the term UE and the term mobile terminal may be used interchangeably. Further, the term eNB and the term base station may be used interchangeably.

Below, the grouping of UEs into UE groups based on their correlated mobility characteristics will be described with reference to FIGS. 6 and 7

Figure 6:
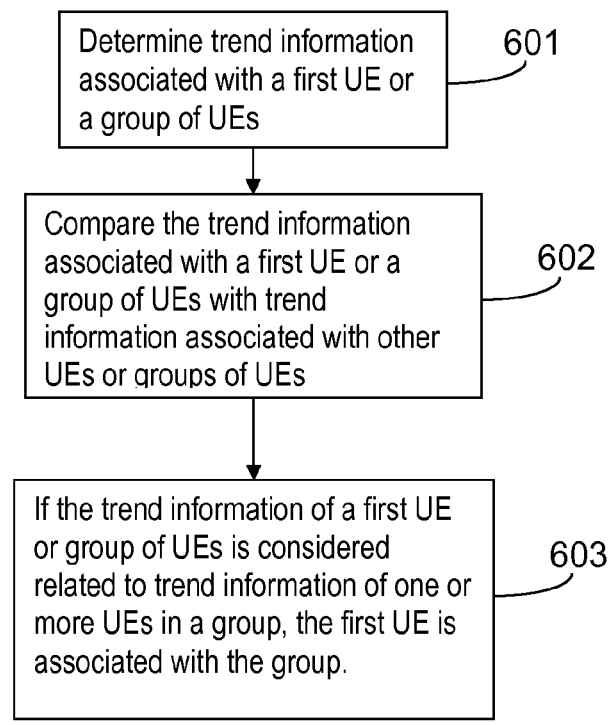
FIG. 6 is a flowchart illustrating an exemplary process of identifying a UE mobility group.

FIG. 6 is a flowchart describing an exemplary method of classifying and grouping of UEs based on trend information. Examples of trend information includes radio signal strength and quality measurements, time alignment measurement, time difference measurements from the UE, as well as channel sounding, random access, time alignment measurements from the eNB. The trend information can also be a velocity estimate as in the case of a Doppler estimator in the eNB, or by comparing the rate of change of measurements associated to two or more time instants.

Two exemplary criteria for grouping of UEs into the same Mobility Group are the timing advance commands and the received signal strength. Other criteria can be used e.g. to refine a UE group already formed.

The method illustrated in FIG. 6 allows grouping of UEs based on whether they are moving in a similar mobility pattern, i.e. with similar speed, according to similar trajectories and in the proximity of each other. With the possibility of such grouping the serving base station can apply optimized mobility policies to all the UEs forming the Mobility Group. For example, the serving eNB may be able to predict and prepare for a handover event for the UEs belonging to the Mobility Group. The method therefore helps optimizing UE mobility performance and reduces mobility failures, e.g., handover failures.

In FIG. 6, trend information associated with a first UE or a group of UEs are first determined 601. The trend information associated with a first UE or group of UEs is compared 602 to the trend information associated with other UEs or groups of UEs. If the trend information of a first UE or group of UEs is considered related to the trend information of one or more UEs in a group, the first UE or the group of UEs is associated 603 with (to) the group.

Figure 7:
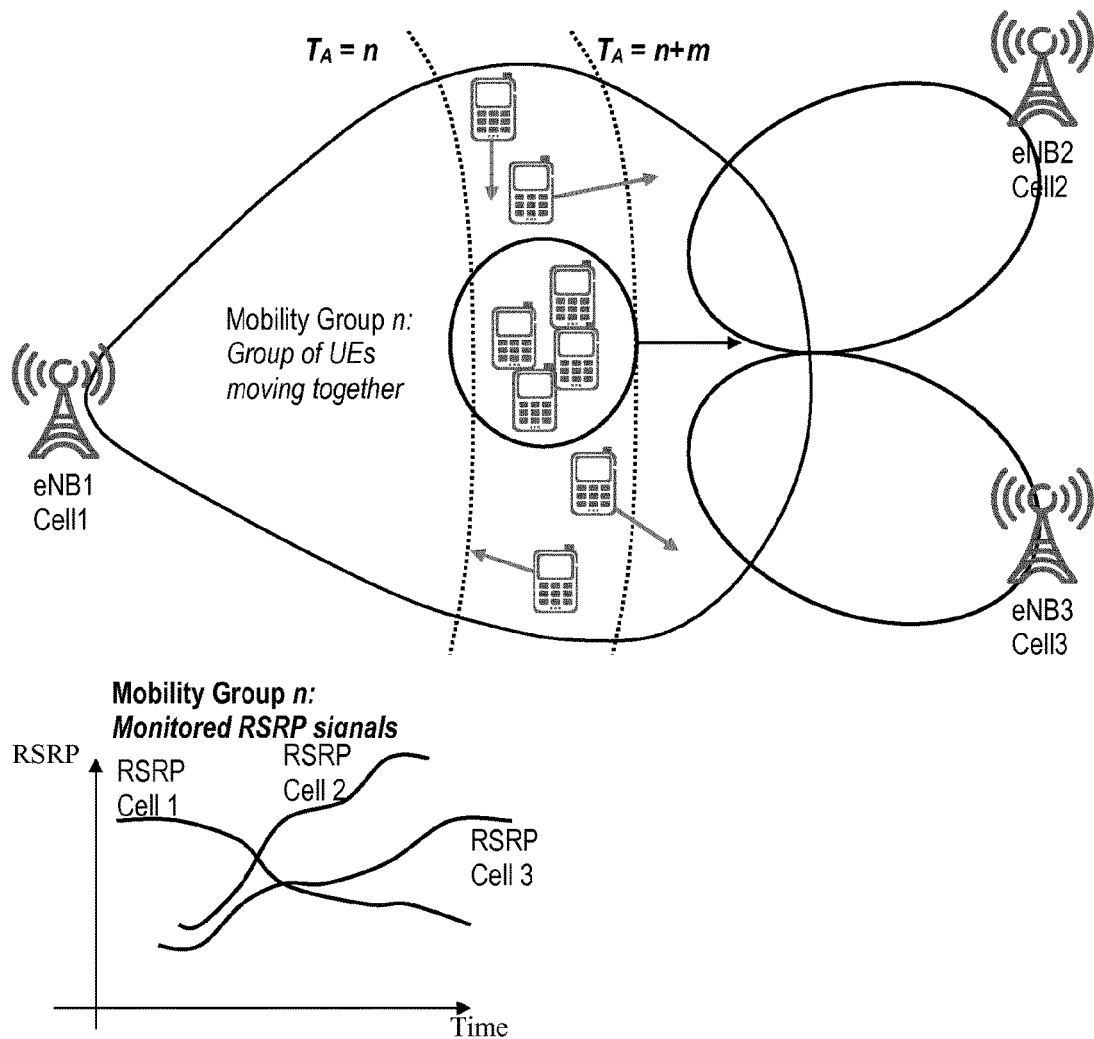
FIG. 7 illustrates an exemplary method of identifying mobile terminals location areas.

FIG. 7 illustrates an exemplary method for identifying a UE mobility group based on trend information comprises determining trend information for a first UE or for each UE in a first group of UEs; comparing the trend information of the first UE or the first group of UEs with trend information of a second UE or a second group of UEs; determining whether the trend information of the first UE or the first group of UEs is related to the trend information of the second UE or the second group of UEs based on a first criterion; and if related, associating the first UE or the first group of UE with the second UE or the second group of UEs to form a UE mobility group.

An eNB may monitor the timing-advance commands or parameters contained in the commands sent to all served UEs via MAC layer over the DL-SCH channel. For example, the parameter monitored may be the Timing Advance Command MAC control element, as specified in TS 36.321v10.5.0.

The Timing Advance Command MAC control element is used to control the amount of timing adjustment that a UE has to apply in UL for the PUCCH/PUSCH/SRS of the primary cell. Its value mainly depends on the distance of the UE from the eNB and it is expressed in multiples of 16 $T_s$, where $T_s=1/(15000\times2048)$ seconds is the basic time unit. The index denoting the Timing Advance Command MAC control element is constituted by an index value TA (0, 1, 2 . . . 63), namely the index is 6 bits long. However, it should be pointed out that Timing Advance commands can also be sent as part of RACH access procedures, but in this case the length of the index value TA is 11 bits, i.e. TA=(0, 1, 2, . . . , 1282).

As shown in FIG. 7, mobile terminals receiving same or similar Timing Advance Command MAC control elements, are either equidistant from the eNB or within an area limited by a maximum and minimum distance from the eNB. In FIG. 7, it is shown how mobile terminals with timing advance setting within a certain range can be located within an area delimited by a maximum and minimum distance from the eNB. If the range of timing advance parameters considered is narrow enough, it is possible to identify mobile terminals that are almost equal distance from the eNB, depending on the errors to which the timing alignment is subject and on particular multipath conditions.

As mentioned above, timing advance commands can be sent as part of dedicated MAC procedures while the UE is in RRC_Connected state. Alternatively, they can be sent as part of the RACH access procedures when the UE is attempting to move from RRC_Idle to RRC_Connected state or when a UE is in a handover.

In the former case, the eNB would need to monitor the Timing Advance Command MAC control element provided to UEs in connected mode to derive similarities in the timing advance settings of served UEs. In the latter case, the eNB would have to monitor Idle to Active transitions or incoming handovers and in particular RACH access procedures, in order to identify the timing advance setting provided to the UE during such procedures and to derive similarity with timing advance settings of other UEs.

However, using only timing advance settings is not sufficient to identify a UE Mobility Group, namely a group of UEs moving together. As shown in FIG. 7, UEs configured with timing advance values within a certain range may be moving in completely different directions and cannot necessarily be grouped together for the purposes of applying shared mobility policies. Therefore a second mechanism, e.g., based on detected cell signals, is needed in order to properly identify a Mobility Group.

The serving eNB may monitor the UEs configured within a certain range of timing alignment indices and tracks their received served cell RSRP values and the RSRP values of each UE's monitored neighbor cell. The signal strength monitored may belong to the same radio access technology as the serving base station within the same or different frequencies, or belong to different radio access technologies than that used by the serving base station. For example, the serving base station may be an LTE system, but the monitored inter RAT signals may be from GSM or WCDMA cells. As shown in FIG. 7, the trend information deduced from the monitored serving and neighbor cells' RSRP will be similar within the same Mobility Group, regardless whether the serving cell and the neighbor cells are using the same radio access technologies.

As part of the RSRP monitoring the eNB could monitor the following parameters in order to identify a Mobility Group of UEs moving in a similar mobility pattern:

Neighbor Cell Global Identities and/or Physical Cell Identity of cells for which RSRP is reported (or equivalent parameters for other RATs besides LTE, e.g. Cell Global Identities and/or scrambling code of UTRAN cells for which RSCP is reported).

Gradient of variation of received signal strength measurements (e.g. RSRP for LTE, RSCP for WCDMA) from each UE and for each reported cell.

Absolute values of received signal strength measurements (e.g. RSRP for LTE, RSCP for WCDMA) reported by each UE for each monitored cell within a given time window.

Once the eNB has monitored timing advance settings e.g. for each served UE and RSRP related characteristics for those UEs with similar timing advance, the eNB will be able to identify the UEs that are moving in a similar way, e.g., because located in the same vehicle or following the same route at the same speed, and to group them together in a Mobility Group.

The Mobility Group detected can be identified with a Mobility Group ID assigned to the group. The eNB may decide to apply the same or similar mobility policies to all UEs identified under such a Mobility Group. This will be further described later below.

The serving eNB may use other support information in conjunction with or instead of Timing Alignment or RSRP. Different parameters may be used alone or in combination to create and/or refine the selection of UEs grouped in a Mobility Group. For example, when a UE group has been identified according to the timing advance mechanism and/or RSRP mechanism described above, one or more of the following could be used to validate and/or refine the list of UEs in the Mobility Group:

Correlation of UE History Information IE (see TS 36.413) received for handovers of UEs of the same group. Namely to compare the time the UE History Information IE was received for each UE (corresponding to the completion of handover preparation for that UE), the list of cells in this IE and the permanence time in each cell for each UE provisionally included in a Mobility Group. If the correlation matches, the UE is proven to be appropriately included in the Mobility Group. For example, with respect to FIG. 7 all UEs in Mobility Group n will be handed over from cell 1 to, e.g., cell 2 within a certain time window. Within such window eNB2 will receive the UE History Information IE for each UE in the group. Further, for each of these UEs the permanence time in Cell 1 will be similar and the cells visited before cell 1 will also be similar.

Doppler estimation: the serving eNB may decide to trigger Doppler estimation for some or all of the UEs initially included in the Mobility Group. Such Doppler estimation will lead to calculation of the frequency $f_r$ and eventually to the velocity of the UE for which the calculation is performed.

If the velocity of the UEs for which a Doppler estimation is performed appear to be the same or within given boundaries, the UEs are more likely to be moving in a similar mobility pattern and should be kept in the same Mobility Group. UEs with velocities that are outside the given boundaries should be removed from the Mobility Group.

Monitoring of other Radio Access Technologies: upon receiving a new indication over RRC, from the serving eNB to the UEs, that the UEs have been included in a Mobility Group with given Mobility Group ID, the UE may also be configured, or autonomously decide, to monitor other available radio access technologies in the neighborhood.

This may lead to detection of, e.g., WiFi cells or other types of radio signals by a UE belonging to a mobility group. The UE may report such detection to the eNB. The eNB, or the node in charge of managing mobility groups, can therefore check whether the radio access technologies and signals reported by the UEs in the Mobility Group are the same or similar. If not the same, the eNB, or the node in charge of managing mobility groups, may decide to move out of the Mobility Group those UEs that have reported detection of different radio access technologies or signals.

For example, in order to validate a Mobility group, a serving eNB, or a node in charge of managing mobility groups, may receive, from other network nodes such as the OAM system, an indication of other radio access technologies monitored by the UEs. Such information may be passed to the eNB, or the node in charge of managing mobility groups, if the system is so configured that measurements on other radio access networks are collected by a centralized node in the network and are then passed to the serving eNB, or the node in charge of managing mobility groups. Such information can be used to validate whether UEs are appropriately allocated to a Mobility Group.

Positioning information: if location information such as GPS location or any information derived from the techniques described in section 1.6 is available to the serving eNB, or the node in charge of managing mobility groups, for some or all of the UEs included in the Mobility Group, the eNB may check whether such information provided by each of the UEs is sufficiently similar. Those UEs showing discrepancies in their location with respect to other UEs in the Mobility Group may be removed from the Mobility Group.

Location information may also be used by the serving eNB, or the node in charge of managing mobility groups, to deduce the overall mobility patterns of the Mobility Group. Namely, if it has been validated that all the UEs in the Mobility Group are moving according to the same trends and if only some of the UEs in the Mobility Group can provide location information, the eNB, or the node in charge of managing mobility groups, may assume the location information provided by a few UEs as representing the mobility trend of the whole group. This might help in applying more accurate and optimized mobility policies to the Mobility Group.

Angle of Arrival: If an estimate of the angle of arrival in a new target cell can be performed for some or all the UEs in a mobility group or for UEs not included in a mobility group, this information can be used to either validate the correctness of UE inclusion in or exclusion from a mobility group.

Whenever the time advance criteria or cell signal strength criteria are not met and/or when some or all of the criteria specified above are not met, i.e. the information gathered for one or more UEs via some or all of the above mentioned techniques do not show any correlation, the eNB, or the node in charge of managing mobility groups, may decide to remove the UE or those UEs from the Mobility Group.

Thereby, the description of the related technique of identifying and creating UE groups is completed. Below, the managing of mobility related procedures in association with such UE groups will be further discussed.

In the above sections, it is disclosed that a group of UEs moving in a similar fashion can be identified, monitored and updated. Once it has been determined that a number of UEs display certain trends in terms of radio signal strength and quality measurements, time alignment measurements, time difference measurements among UEs as well as channel sounding, random access, time alignment measurements from the eNBs, and that such UEs have been classified as a UE group, such a UE group can be treated as if it was a single UE. The identified mobility group may be labeled with a Mobility Group ID, namely an identifier of the mobility group. The multiple UEs in a mobility group can be collectively handled during a handover. For instance, measurement reports from a subset of UEs can be used to prepare handover for the entire group. Collectively handling a handover for a UE mobility group may further comprise issuing a group handover command to all UEs in the group, preparing handover only to a subset of reported neighbors, and/or issuing a single path switch request.

Using a Measurement Report from a Subset of UEs to Prepare Handover for the Whole Group In this exemplifying embodiment, a subset of one or more UEs (henceforth referred to as "early UEs") that belong to a previously identified UE mobility group send measurement reports to the serving eNB. In the measurement reports, one or more neighbor cells may be identified. The measurement reports from a subset of UEs can be used to initiate the handover of all the UEs within the group without necessarily waiting for measurement reports from each and every UE within the group.

All the UEs in a mobility group demonstrate similar mobility behavior relative to the network. For example, they may travel in the same direction and at the same speed or be in the same position roughly at the same time. Their relative position with respect to each other may remain roughly the same on average. The eNB can assume that every UE in the group will encounter the same mobility events as the early UEs. The mobility event as experienced by each UE may happen at different times, according to the UEs' different positions and/or the differences in their RF performance.

Under this assumption, all the other UEs that are within the same group as the early UEs but have not sent measurement reports (henceforth referred to as "late UEs") are expected to send very similar, if not identical, measurement reports. The eNB can initiate a single or multiple HANDOVER PREPARATION procedures towards the neighbor cell(s) in a target eNB reported by the early UEs, for all the UEs in the same group. It shall be noted that existing handover preparation procedures over the X2 interface or over the S1 interface may be used for each UE as currently specified in TS36.413 and TS36.423. For WCDMA such procedures may be over the Iu or Iur interface per standard 25.413 and 25.423. Therefore, the handover preparation procedure can be started for all UEs that belong to the same Mobility Group without waiting for measurement reports from every UE indicating that the handover conditions are fulfilled.

A different approach to achieve handover preparation for all UEs in the group is to use a single handover preparation signaling for the whole group of UEs. In some embodiments, for an S1 handover in a LTE system, there may be a single message for S1:HANDOVER REQUIRED, S1:HANDOVER REQUEST, S1: HANDOVER REQUEST ACKNOWLEDGE and S1: HANDOVER COMMAND. Similarly, for X2 handovers, a single X2: HANDOVER REQUEST and X2: HANDOVER REQUEST ACKNOWLEDGE messages are used for all the UEs that belong to the same mobility group. In order to allow a single preparation for the whole group, a number of approaches may be followed:

1) For core network based mobility, UE specific information for all the UEs within the mobility group can be listed in the Source to Target Transparent Container. This per UE information includes, but is not limited to, Radio Access Bearer information included in the RAB TrCH Mapping IE for WCDMA and in the E-RABs Information List IE for LTE. This information may also include a collective UE History Information IE for all the UEs in the mobility group, where such IE is derived from averaging the information in the UE History Information IE for all the UEs in the mobility group.

2) Still for core network based mobility and for the UEs whose bearer information has not been included in the RAB TrCH Mapping IE for WCDMA or in the E-RABs Information List IE for LTE, UE specific bearer and history information can be included in the RRC Container IE present in the Source To Target Transparent Container IE 3) For X2 or Iur based mobility and on top of the extra information included in the Source To Target Transparent Container IE as described in bullet 1) and 2), UE specific information for all or some of the UEs in the mobility group can be included in the RABs To Be Setup List IE in the RANAP ENHANCED INFORMATION REQUEST message for WCDMA and in the UE Context Information IE container in the X2: HANDOVER REQUEST for LTE. In the latter LTE case, the information regarding the UE context of all or some of the UEs in the mobility group may also be included in the RRC Context IE within the X2: HANDOVER REQUEST message, possibly without any further additions to currently standardized IEs.

Figure 8:
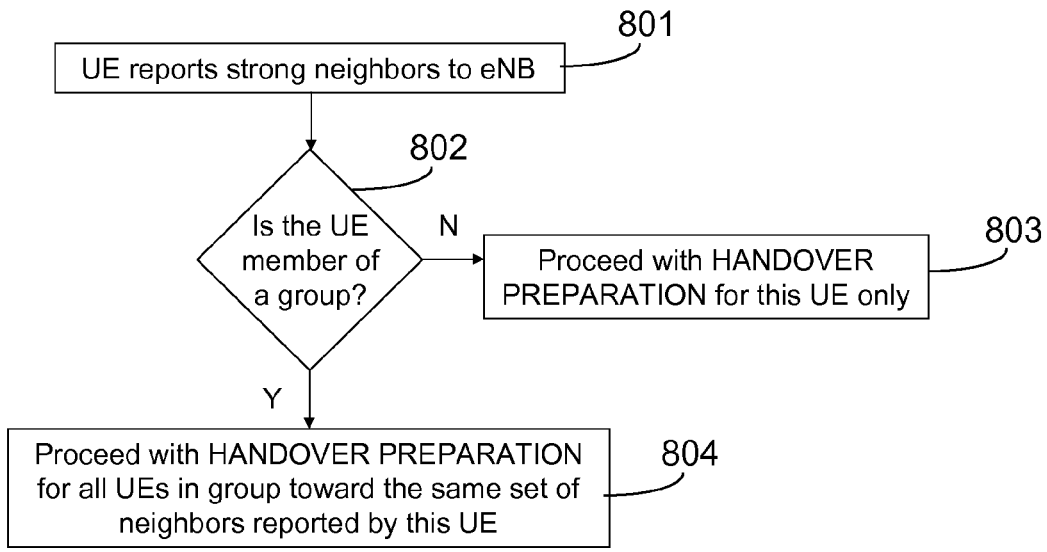
FIGS. 8 and 9 are flow charts illustrating exemplifying procedures according to exemplifying embodiments.

An exemplary procedure is illustrated in FIG. 8. First, a UE reports 801 strong neighbors to its serving eNB. The eNB checks 801 whether the UE is a member of a mobility group. If no, the eNB proceeds with HANDOVER PREPARATION 803 for this UE only. If yes, the eNB proceeds with HANDOVER PREPARATION 804 for all UEs in the group, for a handover to the set of strong neighbors reported by the UE.

In the case of sending only a single Handover request to all of the UEs in the group, the HANDOVER REQUEST ACKNOWLEDGEMENT has to contain the information regarding the group of UEs and their bearers. The target includes a list of the new and old UE X2AP IDs of all the UEs involved in the handover (in the case of X2 handover) or the MME UE S1 AP ID and eNB UE S1AP IDs of all the UEs (in the case of S1 handover). The lists of admitted and not-admitted bearers of all UEs may also be included in the E-RABs admitted and E-RABs not-admitted lists, respectively. Apart from that, the handover command to be sent to each UE is included in the "Target eNB to Source eNB Transparent Container" IE in the case of an X2 handover and "Target to Source Transparent Container" in an S1 handover. If, as will be discussed in the next section, a handover command is to be sent to all UEs in a broadcast fashion, only one entry in the transparent container may be sufficient.

The triggering conditions set for a group handover can be different from those set for individual handovers. For example, UEs can be configured with multiple sets of measurement configurations, one for individual handovers (for example, with lower thresholds) and one for group handovers (for example, with higher thresholds). A group handover is initiated only if the triggering conditions set for a group handover are met. Note that the UEs may be unaware of which measurement report configuration is for individual handover and which is for group handover. UEs can simply treat them as different configurations, and as such the techniques explained herein can be implemented in a backward-compatible fashion. The eNB, however, has to track which reporting configurations (and related measurement IDs) are for individual UEs and which are for the whole group.

Another option is to use individual configurations for a group handover. When a certain number of measurement reports indicating an impending handover are received within certain duration, a group handover may be initiated. Note that in this case, the first few UEs may be handed individually. After a group handover has been initiated, the rest of the UEs within the group will be handed over as a group.

Though most handovers are initiated in response to changes in radio signals, it is possible, especially with heterogeneous deployments, to initiate handovers for load balancing/offloading reasons. In such cases, handovers can be initiated without receiving measurement reports. The concept of group mobility can be used here, where when the serving cells becomes overloaded or when a neighboring cell becomes under-loaded and is able/willing to offload some of the users of the serving cell, handover preparation is started towards the concerned neighbor for all the UEs belonging to the same group, or a subset of the UEs within the group.

Issuing a Group Handover Command by the eNB Via RRC to all UEs in the Group at the Same Time.

If all the bearers of all the UEs that are being handed over together as a group have been admitted at the target, and common measurement and lower layer configurations are to be used for all the UEs in the target cell, then the handover commands to be sent to each UE will have these common features:

a. measConfig will contain the same info
b. mobilityControlInfo, will contain the same info except for the C-RNTI and the optional RACH dedicated preamble to use.
c. radioResourceConfigDedicated IE, will have no DRBs to release and the UEs are already aware of their own RBs.

Thus, it is possible to broadcast the handover command to the group of UEs. This can be done by, for example, using a system information broadcast where the group mobility ID, the target PCI, and the initial C-RNTI, as well as initial dedicated preamble for the group are broadcasted. UEs belonging to the broadcasted group ID will be informed that they are to execute a handover to the broadcasted target PCI.

With regard to the C-RNTI, the above described technique assumes that there is some group membership ID for each UE (for example, assigned each time a UE is added to a group and communicated to the UE). When the handover to a target is requested, this membership ID could be indicated, or the source can order the bearer lists according to an increasing/decreasing membership ID of the UEs so that the target can become aware of the ID indirectly. As an example, assume, the group has three members with IDs 0, 1 and 2. When the target performs admission control, it will allocate CRNT-Is 15, 16 and 17 to these UEs, and communicate such information to the source in the handover request ACK. The target, when it broadcasts the handover command, needs to include C-RNTI value of 15. Each UE can find out the C-RNTI allocated to it by adding the broadcasted C-RNTI and its membership ID. Similar mechanisms can be used in the RACH dedicated preamble.

Another possibility is to broadcast the group handover command from the target as well as the source, because in a handover, UEs most probably experience better radio conditions with the target than the source.

Preparing Handover Only to a Subset of Reported Neighbors.

A different strategy with respect to the first embodiment described above may be used. In one embodiment the eNB waits for several UEs in the same group to report strong neighbors before initiating the preparation for handover. The eNB then performs handover preparation for all UEs in the group toward a subset of the reported neighbors selected based on different criteria such as the ones listed below. The eNB can choose as candidate targets for handover of the group of UEs:

1. The cell(s) reported by most UEs in the group;
2. The strongest cell(s) reported by all the UEs in the group;
3. A combination of the above two.

Figure 9:
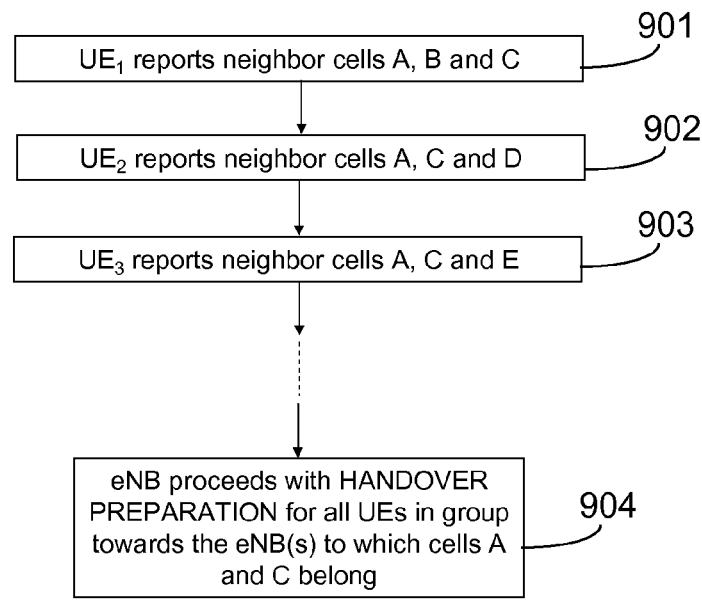

An exemplary flowchart of the embodiment is shown in FIG. 9. It shall be pointed out that currently standardized mobility procedures do not allow for parallel handover preparation for the same UE(s) and towards different cells at the same eNB. However, to overcome this problem, multiple handover preparations can be achieved by including the secondary candidate target cells under the same eNB (i.e. cells that are not the main handover preparation target) in the cells listed in the RRC Container IE (present in both the Source RNC to Target RNC Transparent Container IE—for WCDMA inbound mobility—and Source eNB to Target eNB Transparent Container IE—for LTE inbound mobility) or in the RRC Context IE in the X2: HANDOVER REQUEST message. The eNB hosting the target cells will prepare both the cell indicated as main target in the Target Cell ID IE (contained in the source to target transparent container) and the cells indicated as other reported cells in the RRC Container.

In this embodiment, there is a trade-off between accurate selection of target candidates and time available for handover preparation. As the source eNB waits for more measurements from all the UEs in the group in order to make a more accurate selection, it will also have less time to perform the preparation and the actual handover. On the other hand, if the eNB makes its decision based on fewer UE measurements (or if it bases its decision only on a single UE measurement report), the target(s) it selects might not be the most appropriate for the whole group. Different thresholds or criteria on how many measurements to consider and on how many candidate targets to include in the preparation may be applied depending on the particular situation. For example, how many times a target has to be included in UE measurement reports before that target is selected as a candidate can vary greatly according to the deployment scenario and/or UE speed vs. cell density in the coverage area.

It should be noted that the source can decide, instead of or in addition to multiple handover preparations, to direct a subset of the UEs to different targets. For example, if a group consists of 10 UEs, the source may decide to prepare the first 3 UEs for a handover towards cells A and B and the other 7 UEs towards cells A and C. The methods described above to send the preparations, handover request acknowledgements and handover commands are then applicable to the subset of the UEs that are being handed over to the same targets.

The source eNB can also gather statistics from UE groups identified in the past, in order to learn how to prepare later group handovers (e.g. in case multiple UE groups have been identified having the same distinctive characteristics—two or more groups of UEs on board a very long train, or on different trains traveling along the same route). Statistics about handover preparations can also be gathered per group instead of per cell relation, and be reported to an OAM node.

Issuing a Single Path Switch Request.

In this embodiment, once the target eNB has completed an X2 based handover for the whole group of UEs, it can issue a single PATH SWITCH REQUEST message to the MME containing some or all of the following information:
1) the Mobility Group ID
2) The radio access bearer information in the E-RAB To Be Switched in Downlink List IE for some or all of the UEs
3) UE Context information for some or all of the UEs in the group such as multiple eNB UE S1AP ID IE for all UEs in the Mobility Group; multiple Source MME UE S1AP ID IE for all UEs in the Mobility Group; multiple UE Security Capabilities IE for all UEs in the Mobility Group.

The MME will be informed either implicitly or explicitly of the Mobility Group ID and the list of its members either by the eNB that first creates the group or by the eNB that first sends the enhanced PATH SWITCH REQUEST message.

If the eNB that first creates the Mobility Group is to inform the MME of such event, such process can either be achieved by means of new signaling over the S1 or RANAP protocols or by means of existing procedures. As an example, in an LTE system, procedures that can be reused are the eNB DIRECT INFORMATION TRANSFER message or the UE CAPABILITY INFO INDICATION message from the eNB to the MME. Either the new messages or the existing ones will have to contain the Mobility Group IE and UE identification IEs such as (in the LTE case) one or both the S1AP IDs corresponding to each UE in the mobility group, namely one or both of the eNB UE S1AP ID IE and MME UE S1AP ID IE. The existing or new messages used in this mechanism may also be used to amend the list of UEs in the mobility group.

The MME receiving this information stores it for future use. When messages referring only to a Mobility Group ID are received by the MME, it is possible to deduce that the Mobility Group ID refers to all the UEs previously associated with such mobility group.

If the MME is implicitly informed of the mobility group creation, the MME comes to know about the existence of the mobility group (i.e. Mobility Group ID and member UEs) at first reception of the enhanced PATH SWITCH REQUEST message described above. The MME may be informed about changes to the mobility group purely by means of following PATH SWITCH REQUEST messages.

As described above, the MME receiving this information stores it for future use. When messages referring only to a Mobility Group ID are received by the MME, it is possible to deduce that the Mobility Group ID refers to all the UEs previously associated with such mobility group. For example, after the first PATH SWITCH REQUEST message containing Mobility Group ID IE and the details on member UEs is received, provided that there are no changes to the mobility group, following PATH SWITCH REQUEST messages in reference to handovers of the UEs in the mobility group may contain only the Mobility Group ID. This provides the MME the information about which bearers for each UE in the mobility group need to be switched and how they should be configured.

In S1 handovers, instead of PATH SWITCH messaging, the target sends a HANDOVER NOTIFY message that tells the MME that the UE has been identified in the target cell (i.e. have performed RACH access and synchronized) and the MME can then issue the MODIFY BEARER REQUEST command towards the SGW. Similar to the PATH SWITCH, a single HANDOVER NOTIFY message can be used for communicating this to the MME which can be done in several ways. For example:
Using lists instead of single entries in the MME UE S1AP ID and eNB UE S1AP IDs (i.e. list of the IDs of all the UEs involved in the group handover)
Including the group ID in the HANDOVER REQUEST from the MME to the target, which is then used in the HANDOVER REQUEST ACK and HANDOVER NOTIFY to be sent towards the MME A MODIFY BEARER REQUEST is sent from the MME to the SGW in response to a PATH SWITCH REQUEST for X2 handovers and a HANDOVER NOTIFY for S1 handover. Either an individual request is sent for each UE, or in the case of PATH SWITCH and HANDOVER NOTIFY, only one message that includes the information of all the UEs that are being handed over as a group is sent. Some of the IEs that require change/update in this list are: (see 29.724 for all the fields included I in MODIFY BEARER REQUEST):

Mobile Equipment Identity (MEI), which now becomes a list of all the UEs in the group Bearer contexts to be modified, which now includes all the admitted bearers of all the UEs Bearer contexts to be removed, which now includes all the non-admitted bearers of all the UEs The MODIFY BEARER RESPONSE and PATH SWITCH REQUEST ACKNOWLEDGE messages are updated in a similar fashion to the MODIFY BEARER REQUEST and PATH SWITCH REQUEST, respectively, to include information about all the UEs involved in the group handover.

There are at least two advantages with the first embodiment described above. First, the handover has more time to complete, especially for the late UEs that report neighbors after the early UEs, thus avoiding or minimizing the risk of handover failures especially when the group of UEs is moving at high speeds. Secondly, it will give more time to the candidate target neighbors to allocate appropriate resources for the UEs. It can also be argued that by receiving several HANDOVER PREPARATION REQUEST messages at the same time, it will be easier for the target eNBs to accurately reserve appropriate resources for inpending handovers. An additional advantage is the saved signaling because some UEs are no longer needed to send measurement reports. This will also reduce battery consumption by these UEs.

The advantage of the second embodiment described above is that the handover command does not necessarily have to be sent to each individual UE in the group, which can greatly reduce the overall handover signaling overhead. Also, one of the major causes of radio link failures is bad radio conditions experienced by a UE when a handover command is sent to the UE causing the loss of the handover command. Sending a handover command to all users in a broadcast fashion and/or by both the source and the target cell can ensure a timely and reliable reception of the command.

The advantage of the third embodiment described above is that it offers the flexibility of optimizing accuracy in target selection over gained time by making decision based on the first few UE measurements, or optimizing gained time over accuracy in target selection (deciding on fewer UE measurements, or even a single one). The third embodiment can therefore be applied to several use cases. For example, if UEs travel at a high speed it is advantageous to optimize gained time for handover preparation. On the other hand, if the UEs travel at lower speeds but possibly in an urban scenario characterized by dense cell deployment, it will be advantageous to optimize accuracy in handover target selection.

The advantage of the fourth embodiment is that single PATH SWITCH REQUEST/PATH SWITCH REQUEST ACK/HANDOVER NOTIFY/MODIFY BEARER REQUEST/MODIFY BEARER RESPONSE messages are used for the whole group rather than one message for each UE, thereby saving a considerable amount of signaling to and from the core network. Such advantage is more significant for large groups of UEs, as it may be in the case of a high speed train carrying many UEs.

Embodiments described herein also relate to a base station operable in a wireless communication system. The base station is adapted to perform at least one embodiment of the method described above. The base station is associated with the same technical features, objects and advantages as the method described above and illustrated e.g. in FIG. 1. The base station will be described in brief in order to avoid unnecessary repetition.

Figure 10:
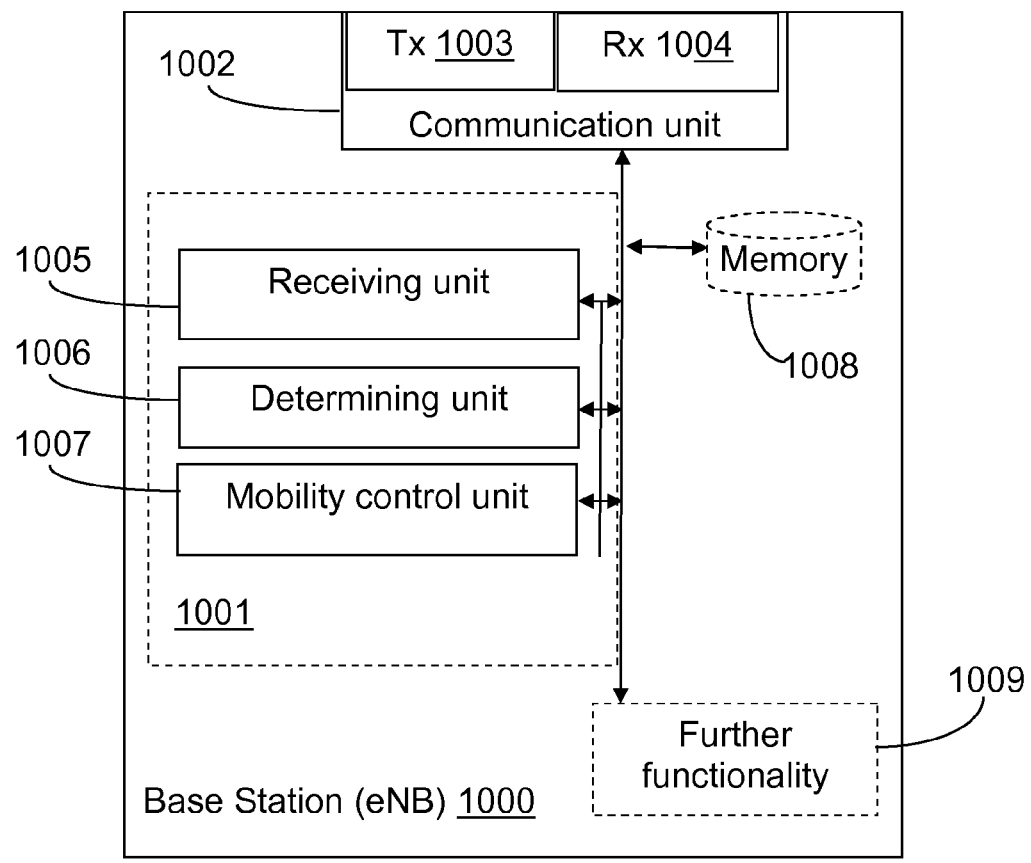
FIGS. 10-13 are block charts illustrating arrangements according to exemplifying embodiments.

Below, an exemplifying base station 1000, adapted to enable the performance of an above described method for mobility procedures will be described with reference to FIG. 10. The part of the base station which is most is most affected by the adaptation to the herein described method is illustrated as an arrangement 1001, surrounded by a dashed line. The base station could be e.g. an eNB, or a NodeB, depending on in which type of communication system it is operable, e.g. LTE or WCDMA. The base station 1000 and arrangement 1001 is further illustrated as to communicate with other entities via a communication unit 1002 which may be regarded as part of the arrangement 1001. The arrangement or network node may further comprise other functional units 1009, such as e.g. functional units providing regular eNB functions, and may further comprise one or more storage units 1008.

The arrangement 1001 could be implemented e.g. by one or more of: a processor or a micro processor and adequate software and memory for storing thereof, a Programmable Logic Device (PLD) or other electronic component(s) or processing circuitry configured to perform the actions described above, and illustrated e.g. in FIG. 1 or 5.

The arrangement part of the base station may be implemented and/or described as follows:

The base station comprises a receiving unit 1005, adapted to receive, from a first UE in the UE group, a mobility related parameter associated with the first UE The base station further comprises a determining unit 1006, adapted to determine whether to initiate a mobility related procedure for a second UE in the UE group based on the received mobility related parameter; and further comprises a mobility control unit 1007, adapted to initiate the mobility related procedure for the second UE when it is determined that the mobility related procedure is to be performed.

The determining may comprise determining whether to initiate a mobility related procedure for the first UE based on the received mobility related parameter and applying the result on the second UE belonging to the same group.

The mobility related procedure may be a handover procedure.

The base station may be adapted to initiate the mobility related procedure by transmitting a handover request to a target network node.

The mobility related parameter may be one or more of:
a report of a measured signal strength at the first UE;
a report of a measurement on a signal received by the first UE from a neighboring base station;
information on the geographical position of the first UE; and
a report of a measurement on a signal received by the first UE from an access point in another wireless communication system.

The base station may be adapted to receive a respective mobility related parameter associated with a number of other UEs in the UE group; and the initiating of the mobility related procedure may further be based on said received number of mobility related parameters.

The base station may be adapted to initiate the mobility related procedure towards a cell, which cell is reported as being a neighbor cell by the largest number of UEs in the UE group or which cell is the strongest cell reported by a plurality of UEs in the UE group The mobility related procedure may be initiated for a plurality of UEs in the UE group, said plurality comprising the second UE, or even for the whole UE group.

The initiating may comprise using a single mobility command for a plurality of UEs in the UE group.

Embodiments described herein also relate to a network node operable in a communication system. The network node is adapted to perform at least one embodiment of the method described above e.g. in association with FIG. 2. The network node is operable to be associated with a handover of a plurality of UEs in a UE group, said UE group comprising UEs having correlated mobility related parameters. The network node is associated with the same technical features, objects and advantages as the method to be performed by a network node, which method is described above. The network node will be described in brief in order to avoid unnecessary repetition.

Figure 11:
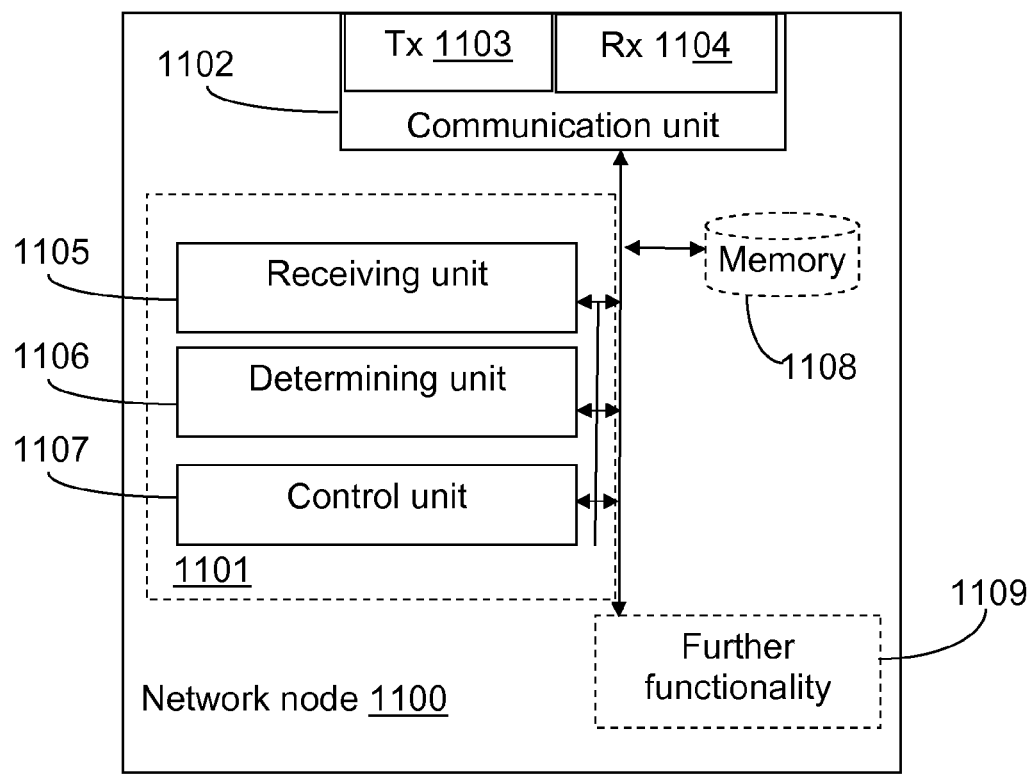

Below, an exemplifying network node 1100, adapted to enable the performance of an above described method for mobility procedures will be described with reference to FIG. 11. The part of the network node which is most affected by the adaptation to the herein described method is illustrated as an arrangement 1101, surrounded by a dashed line. The network node could be a base station such as an eNB, or an MME node in a communication system. The network node 1100 and arrangement 1101 is further illustrated as to communicate with other entities via a communication unit 1102 which may be regarded as part of the arrangement 1101. The arrangement or network node may further comprise other functional units 1109, such as e.g. functional units providing regular eNB or MME functions, and may further comprise one or more storage units 1108.

The arrangement 1101 could be implemented e.g. by one or more of: a processor or a micro processor and adequate software and memory for storing thereof, a Programmable Logic Device (PLD) or other electronic component(s) or processing circuitry configured to perform the actions described above, e.g. in conjunction with FIG. 2.

The arrangement part of the network node may be implemented and/or described as follows:
The network node comprises a receiving unit 1105, adapted to receive information indicating that the plurality of UEs being subjected to the handover have connected to a target node. The network node further comprises a control unit 1107, adapted to transmit a single path switch request or a single modify bearer request for the plurality of the UEs in the UE group being subjected to the handover. The network node is illustrated as comprising a determining unit 1106, which may be adapted e.g. to analyze the received information and to trigger the control unit when determined adequate. Such functions could alternatively or in addition be performed in the receiving unit 1105 and/or the control unit 1107, which would then be adapted to perform such actions The network node may be the target node, to which the plurality of UEs mentioned above is handed over.

Embodiments described herein also relate to a UE operable in a wireless communication system. The UE is adapted to perform at least one embodiment of the method described above. The base station is associated with the same technical features, objects and advantages as the method described above and illustrated e.g. in FIG. 3. The UE will be described in brief in order to avoid unnecessary repetition.

Figure 12:
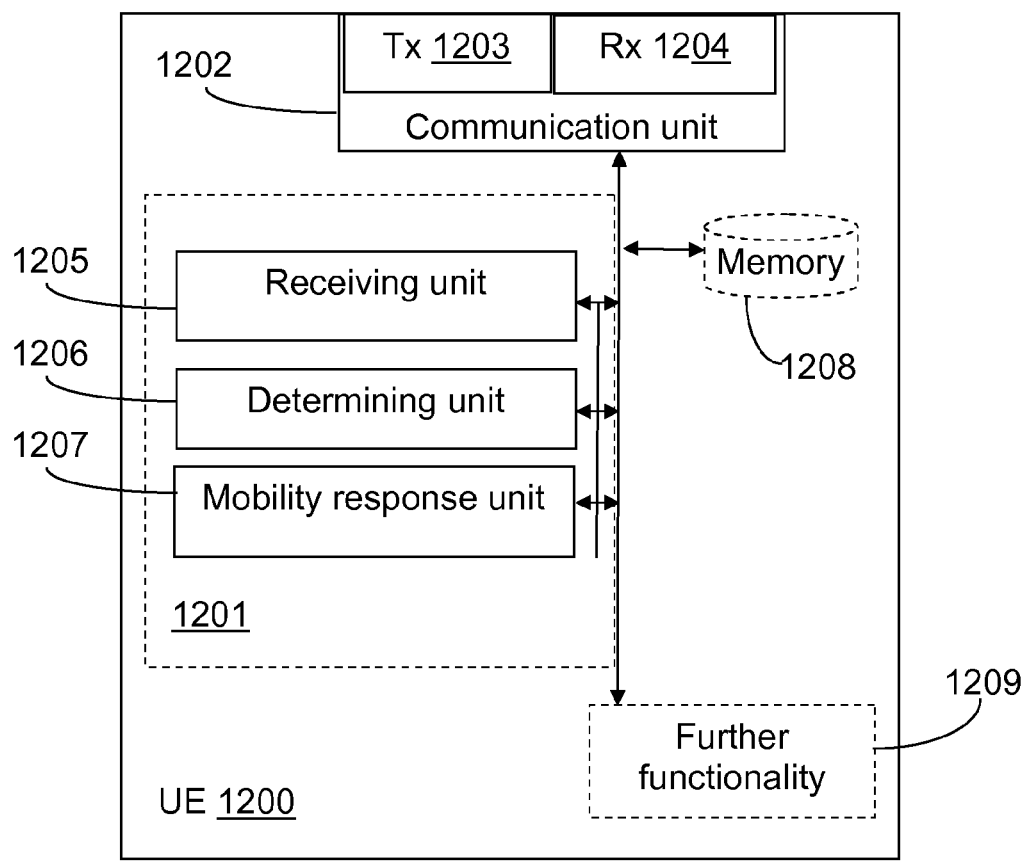

Below, an exemplifying UE 1200, adapted to enable the performance of an above described method for mobility procedures will be described with reference to FIG. 12. The part of the UE which is most affected by the adaptation to the herein described method is illustrated as an arrangement 1201, surrounded by a dashed line. The UE could be operable, e.g. in an LTE and/or WCDMA system or in a multi-RAT system. The UE 1200 and arrangement 1201 are further illustrated as to communicate with other entities via a communication unit 1202 which may be regarded as part of the arrangement 1201. The arrangement or network node may further comprise other functional units 1209, such as e.g. functional units providing regular UE functions, and may further comprise one or more storage units 1208.

The arrangement 1201 could be implemented e.g. by one or more of: a processor or a micro processor and adequate software and memory for storing thereof, a Programmable Logic Device (PLD) or other electronic component(s) or processing circuitry configured to perform the actions described above, and illustrated e.g. in FIG. 3.

The UE is operable to be comprised in, i.e. to belong to, a UE group comprising UEs having correlated mobility related parameters, and operable to have access to, e.g. receive and store, a first identifier identifying the UE group in which the first UE is comprised.

The arrangement part of the UE may be implemented and/or described as follows:
The UE comprises a receiving unit 1205, adapted to receive a broadcasted mobility related command from a base station, said command comprising a second identifier, identifying a UE group. The UE further comprises a determining unit 1206, adapted to determine, based on the first and second identifier, whether the UE belongs to the UE group identified by the second identifier. The UE further comprises a mobility response unit 1207, adapted to respond to the received command when it is determined that the UE belongs to the UE group identified by the second identifier.

The UE may further be operable to be associated with an identity within the UE group, and the received mobility related command may further comprise a CRNT-I assigned to a UE in the UE group, which UE group is identified by the second identifier. The UE may then be further adapted to determine, when the first UE belongs to the UE group identified by the second identifier, a CRNT-I, assigned to the first UE, based on the identity, e.g. a number, within the UE group and the CRNT-I comprised in the mobility related command.

Figure 13:
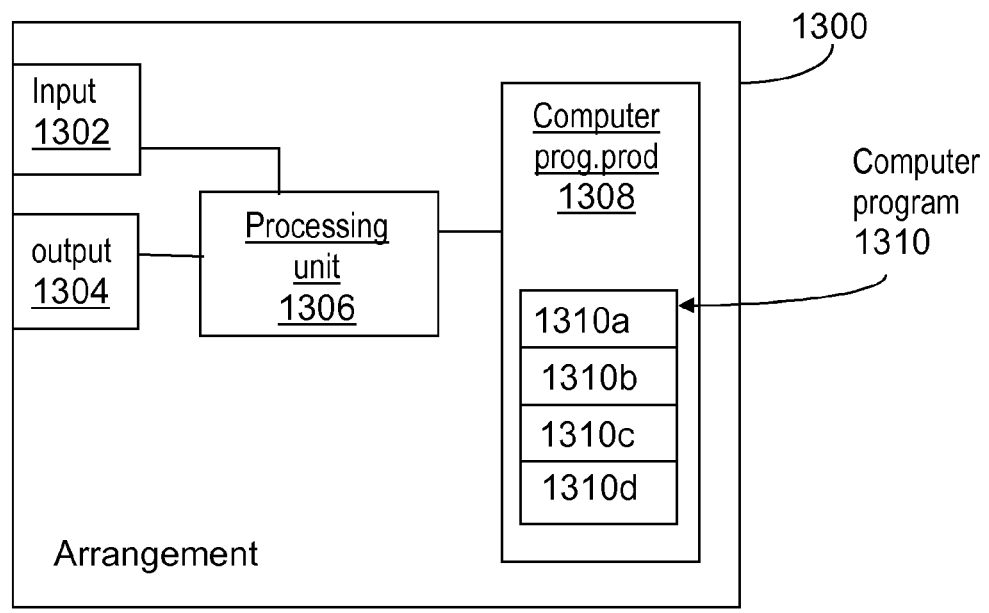

FIG. 13 schematically shows an embodiment of an arrangement 1300 which may be used in a network node 1000. Comprised in the arrangement 1300 are here a processing unit 1306, e.g. with a DSP (Digital Signal Processor). The processing unit 1306 may be a single unit or a plurality of units to perform different actions of procedures described herein. The arrangement 1300 may also comprise an input unit 1302 for receiving signals from other entities, and an output unit 1304 for providing signal(s) to other entities. The input unit and the output unit may be arranged as an integrated entity or as illustrated in the example of FIG. 13.

Furthermore, the arrangement 1300 comprises at least one computer program product 1308 in the form of a non-volatile or volatile memory, e.g. an EEPROM (Electrically Erasable Programmable Read-Only Memory), a flash memory and a hard drive. The computer program product 1308 comprises a computer program 1310, which comprises code means, which when executed in the processing unit 1306 in the arrangement 1300 causes the arrangement 1300 and/or the base station in which it is comprised to perform the actions e.g. of the procedure described earlier in conjunction with FIG. 1.

The computer program 1310 may be configured as a computer program code structured in computer program modules 1310a-1310d. Hence, in an exemplifying embodiment, the code means in the computer program of the arrangement 1300 comprises a receiving module 1310a, for receiving a mobility related parameter associated with a first UE. The computer program may further comprise a determining module 1310b, for determining whether to initiate a mobility related procedure for a second UE in the UE group based on the received mobility related parameter. The computer program further comprises an initiating module 1310c, for initiating the mobility related procedure for the second UE when it is determined that the mobility related procedure is to be performed. The computer program may further comprise further modules, illustrated as module 1310d, e.g. for controlling and performing other mobility related procedures associated with a UE group.

The computer program modules could essentially perform the actions of the flow illustrated in FIG. 1, to emulate the arrangement 1001 in the network node 1000. In other words, when the different computer program modules are executed in the processing unit 1306, they may correspond e.g. to the units 1005-1007 of FIG. 10.

It is to be understood that corresponding arrangements, as the one for a base station described above, could be implemented also for a network node and a UE. The structure could be the same, but the computer program modules would then be arranged to comprise code, which when executed in the processing unit would perform or trigger the performing of the actions described e.g. in conjunction with FIGS. 2 and 3 above.

Although the code means in the embodiments disclosed above in conjunction with FIG. 13 are implemented as computer program modules which when executed in the processing unit causes the test device to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the test device.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments.

Figure 14:
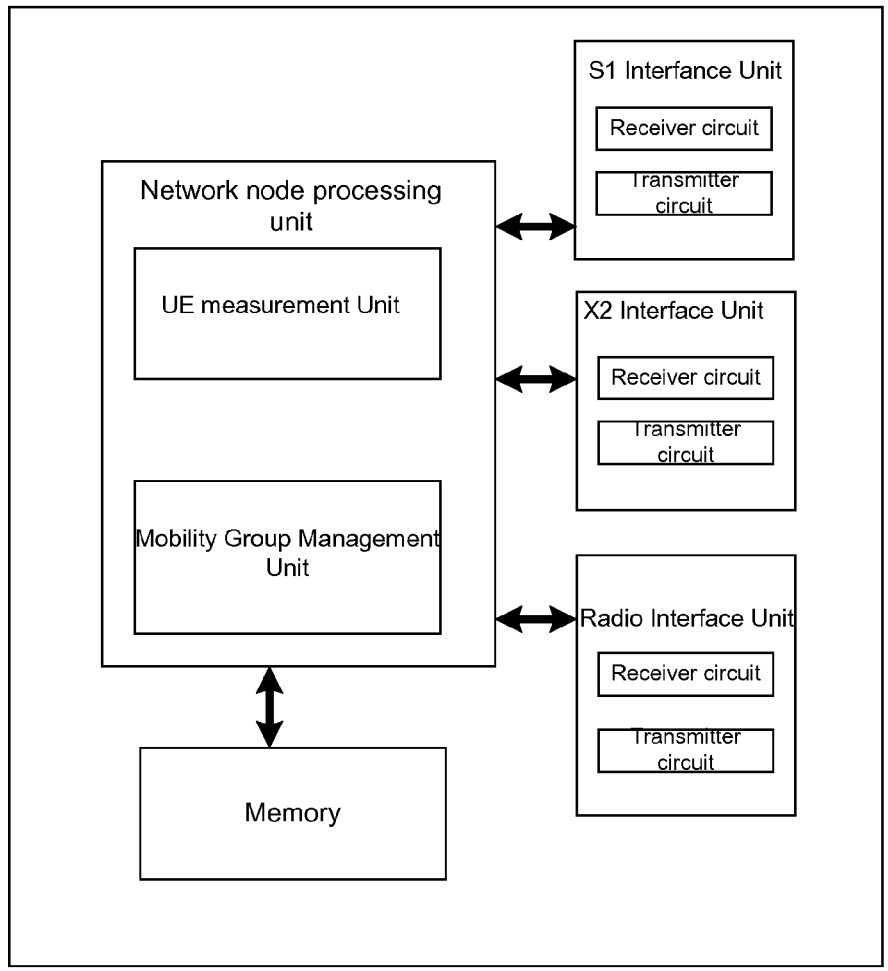
FIG. 14 illustrates an exemplary apparatus configured to manage the handover of a UE mobility group as a group.

FIG. 14 illustrates an exemplary network node processing unit that is configured to identify UE mobility groups and manage the UEs belonging to a UE mobility group as a group. The node in FIG. 14 includes an S1 interface that enables the node to communicate with mobility management entities (MMEs), an X2 interface unit that enables the node to communicate with other nodes, and a radio interface unit that enables the node to communicate with UEs. The X2 interface unit is configured to receive information about UEs from other base stations or nodes. Such information may comprise UE History Information or other radio access technologies monitored by the UE. The radio interface unit is configured to communicate with the served UEs, including configuring measurement reporting from such UEs. The radio circuitry can be configured to reconfigure the measurement reporting of UEs to validate and verify that UEs are appropriately included in a given Mobility Group.

The node also includes a UE measurement unit that performs various measurements to obtain, e.g., trend information associated with each UE. The node also includes a Mobility Group management Unit that identifies UE groups based on the measurements or trend information obtained for the UEs and manages the UE groups for mobility events or resource allocation. The Mobility Group management unit is configured to use the information provided by the UE or by other network nodes to evaluate whether one or more UEs are moving according to the same trends and shall be grouped together in a Mobility Group. The node also includes a memory for storing UE measurement data and other necessary information required by the various units of the node.

Figure 15:
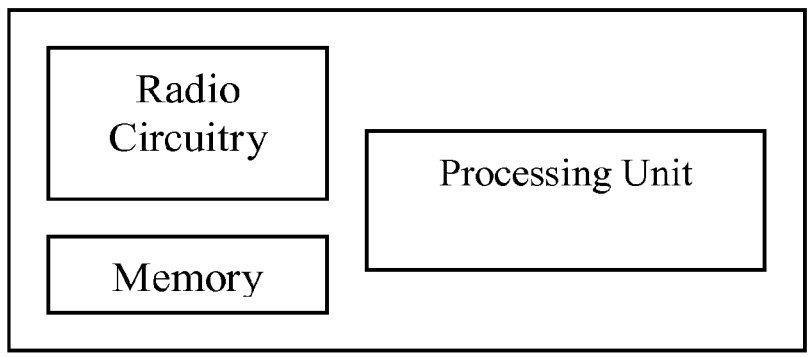
FIG. 15 illustrates an exemplary apparatus configured to receive and process group handover commands.

An exemplary UE configured to practice the above described methods is illustrated in FIG. 15. The apparatus is arranged with radio circuitry to communicate with network nodes, a memory to store information related to the disclosed solution, and a processing unit that is configured to receive and process commands from network nodes. For example, the processing unit is configured to process a group handover command issued by an eNB, or other commands related to group handover as described above.

Those skilled in the art will appreciate that the functions and means explained herein below may be implemented using software functioning in conjunction with a programmed microprocessor or general purpose computer, and/or using an application specific integrated circuit (ASIC). It will also be appreciated that while embodiments of the disclosed solution are primarily described in the form of methods and nodes, they may also be embodied in a computer program product as well as in a system comprising a computer processor and a memory coupled to the processor, wherein the memory is encoded with one or more programs that may perform the functions disclosed herein.

APPENDIX TO DETAILED DESCRIPTION

In the foregoing part of the detailed description, it is referred to different mobility related parameters in a wireless communication system, such as an LTE system. For the interested, a description of some of these mobility related parameters and their use follows below. It is placed at the end of the detailed description in order not to obscure the understanding of the herein suggested solution.

LTE Architecture.

Figure 16:
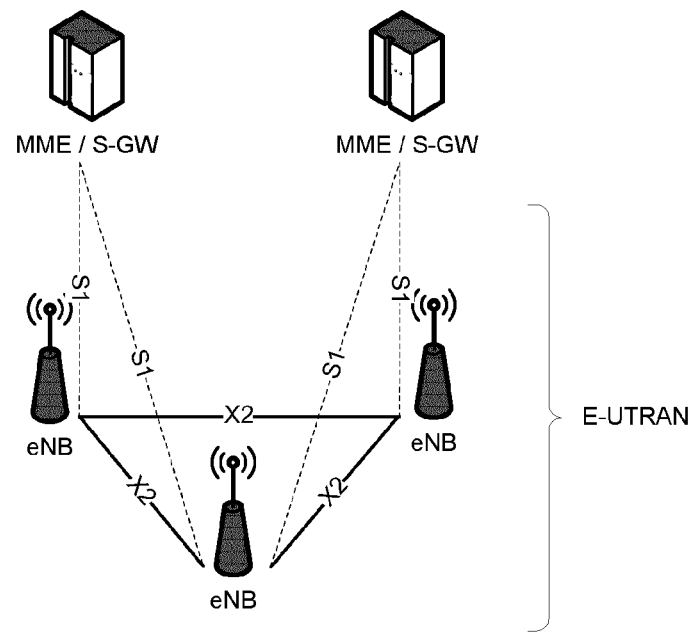
FIG. 16 is a network diagram illustrating the logic interfaces between radio access nodes and core nodes in an exemplary wireless network.

The third generation partnership project (3GPP) is currently working on standardization of Release 12 of the Long Term Evolution (LTE) concept. The architecture of the LTE system as shown in FIG. 16 includes radio access nodes (eNBs) and evolved packet core nodes (MME/S-GW).

Figure 17:
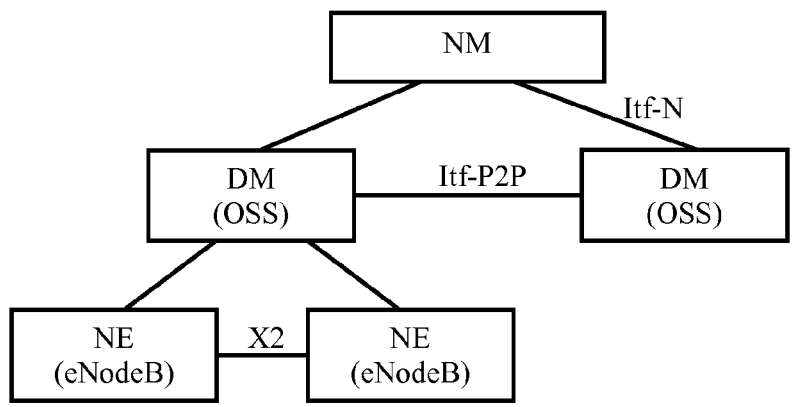
FIG. 17 is a diagram illustrating an exemplary management system in a communications network.

An exemplary management system that will be referenced in the later sections of this disclosure is shown in FIG. 17. The node elements (NE), also referred to as eNodeB or eNB, are managed by a domain manager (DM), also referred to as the operation and support system (OSS). A DM may further be managed by a network manager (NM). The interface between the two NEs is X2 interface, whereas the interface between the two DMs is referred to as Itf-P2P. The management system may perform configuration as well as monitoring of the network elements, e.g., receive observations/measurements associated with features of the network elements. For example, the DMs in FIG. 17 monitor and configure the NEs, while the NM monitors and configures the DMs, as well as the NEs via the DMs.

In this disclosure, it is further assumed that any function that automatically optimizes NE parameters can in principle be executed by a NE, DM, or a NMS. Such features are referred to as Self-Organizing Network (SON) features.

Cell Selection

The idle mode cell selection and reselection procedure in LTE [3GPP 36.304] is based on both stored information and information acquired from broadcasted system information, and evaluations of radio frequency measurements by the UE.

The cell selection evaluation process is based on a criterion S, which is fulfilled when:

Srxlev>0 AND Squal>0 where:

Srxlev=Qrxlevmeas−(Qrxlevmin+Qrxlevminoffset)−Pcompensation;

Squal=Qqualmeas−(Qqualmin+Qqualminoffset).

where:

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | max($P_{EMAX}-P_{PowerClass}$, 0) (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

The signaled values Qrxlevminoffset and Qqualminoffset are only applied when a cell is evaluated for cell selection as a result of a periodic search by a UE for a higher priority PLMN (Public Land Mobile Network) while camped normally in a VPLMN (Visited Public Land Mobile Network). During a periodic search for higher priority PLMN, the UE may check the S criteria of a cell using parameter values stored from a different cell of this higher priority PLMN.

UE Measurements.

UEs can be configured to report measurements, for example, to support mobility. As specified in 3GPP TS 36.331, the E-UTRAN standards provide a measurement configuration applicable for a UE in RRC_CONNECTED by means of dedicated signaling, i.e. using the RRCConnectionReconfiguration message. The following measurement configurations can be signaled to the UE:

Measurement objects: These define on what the UE should perform the measurements—such as a carrier frequency. The measurement objects may also include a list of cells to be considered (white-list or black-list) as well as associated parameters, e.g. frequency- or cell-specific offsets.

Reporting configurations: These consist of the periodic or event-triggered criteria which cause the UE to send a measurement report, as well as the details of what information the UE is expected to report (e.g. the quantities, such as Received Signal Code Power (RSCP) for UMTS or Reference Signal Received Power (RSRP) for LTE, and the number of cells).

Measurement identities: These identify a measurement and define the applicable measurement object and reporting configuration. Each measurement identity links one measurement object with one reporting configuration. By configuring multiple measurement identities it is possible to link more than one measurement object to the same reporting configuration, as well as to link more than one reporting configuration to the same measurement object. The measurement identity is used as a reference number in the measurement report.

Quantity configurations: The quantity configuration defines the filtering to be used on each measurement. One quantity configuration is configured per RAT type, and one filter can be configured per measurement quantity.

Measurement gaps: Measurement gaps define time periods when no uplink or downlink transmissions will be scheduled, so that the UE may perform the measurements (e.g. inter-frequency measurements where the UE has only one Tx/Rx unit and supports only one frequency at a time). The measurement gaps are common for all gap-assisted measurements In E-UTRAN standards, only a single measurement object is configured for a given frequency, but more than one measurement identity may use the same measurement object. The identifiers used for the measurement object and reporting configuration are unique across all measurement types. It is possible to configure the quantity that triggers the report (RSCP or RSRP) for each reporting configuration.

In LTE, the most important measurement metric used are the Reference Signal Received Power (RSRP) and Reference Signal Received Quality (RSRQ). RSRP is a cell specific measure of signal strength and it is mainly used for ranking different cells for handover and cell reselection purposes. It is calculated as the linear average of the power of the Resource Elements (REs) which carry cell-specific Reference Signals (RSs). The RSRQ, on the other hand, also takes the interference into consideration by taking the total received wideband power into account as well.

One of the measurement configuration parameters that UEs receive from their serving eNBs is the S-measure, which tells the UE when to start measuring neighboring cells. If the measured RSRP of the serving cell falls below the S-measure, indicating the signal of the serving cell is no longer as strong as previously measured, the UE starts measuring the signal strength of RSs from the neighboring cells. The S-measure is an optional parameter and different S-measure values can be specified for initiating intra-frequency, inter-frequency and inter-RAT measurements.

Once the UE is enabled for measuring, it can report any of the following:
  The serving cell
  Listed cells (i.e. cells indicated as part of the measurement object);
  Detected cells on a listed frequency (i.e. cells which are not listed cells but are detected by the UE).

There are several measurement configuration parameters that specify the triggering of measurement reports from the UE. The following event-triggered criteria are specified for intra-RAT measurement reporting in LTE:
  Event A1: Primary serving cell (PCell) becomes better than an absolute threshold.
  Event A2: PCell becomes worse than an absolute threshold.
  Event A3: Neighbour cell becomes better than an offset relative to the PCell.
  Event A4: Neighbour cell becomes better than an absolute threshold.
  Event A5: PCell becomes worse than one absolute threshold and neighbour cell becomes better than another absolute threshold.
  Event A6: Neighbour cell becomes better than an offset relative to a secondary cell (SCell)

For inter-RAT mobility, the following event-triggered reporting criteria are specified:
  Event B1: Neighbour cell becomes better than an absolute threshold.
  Event B2: Serving cell becomes worse than one absolute threshold and neighbour cell becomes better than another absolute threshold.

Figure 18:
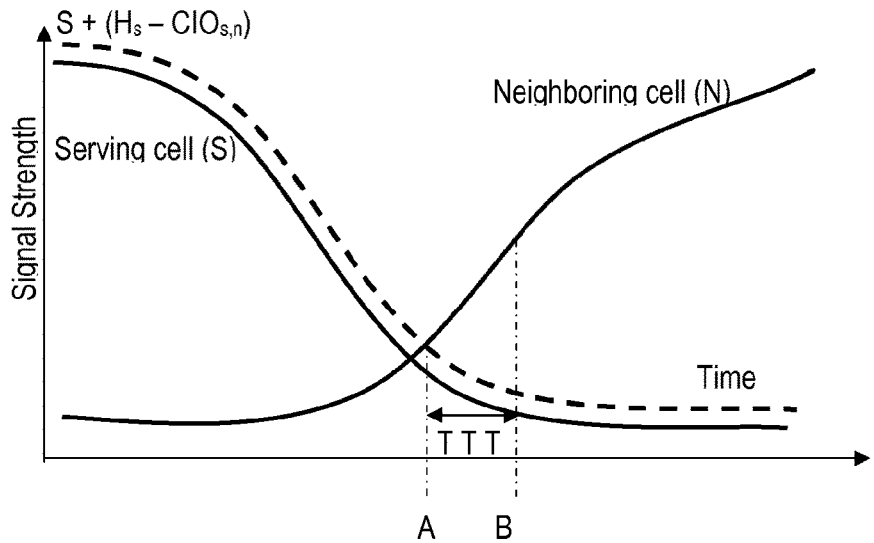
FIG. 18 illustrates a handover event triggered by signal strength measurements of two neighboring cells.

The most widely used measurement report triggering event related to handover is A3, and its usage is illustrated in FIG. 18. The triggering conditions for event A3 can be formulated as:

$$N > S + HOM \quad (1)$$

where N and S are the signal strengths of the neighboring and serving cells, respectively, and HOM is the handover margin. HOM is the difference between the radio quality of the serving cell and the radio quality needed before attempting a handover. The radio quality is measured either using RSRP or RSRQ (see 3GPP TS 36.133 for further explanation).

The UE triggers the intra-frequency handover procedure by sending event A3 report to the serving eNB. This event occurs when the UE discovers that the target cell is better than the serving cell with a margin "HOM". The UE is configured over RRC when entering a cell and the HOM is calculated from the following configurable parameters:

$$HOM = Ofs + Ocs + Off - Ofn - Ocn + Hys;$$

where:
  Ofs is the frequency specific offset of the serving cell,
  Ocs is the cell specific offset (CIO) of the serving cell,
  Off is the a3-Offset,
  Ofn is the frequency specific offset of the neighbor cell,
  Ocn is the CIO of the neighbor cell,
  Hys is the hysteresis.

If the condition in (1) is satisfied and it remains valid for a certain duration known as Time To Trigger (TTT), the UE sends a measurement report to the serving eNB (in FIG. 18, event A3 is satisfied at point A and measurement report is sent at point B in time). When the serving eNB receives the measurement report, it can initiate a handover towards the neighboring cell.

In addition to event-triggered reporting, the UE may be configured to perform periodic measurement reporting. In such case, the same parameters configured for event-triggered reporting may be used, except that the UE starts reporting immediately rather than only after the occurrence of an event.

LTE Mobility in Connected Mode

The LTE handover preparation and execution can essentially be completed over the X2 interface without involving the core network. However, some details needs to be passed or negotiated between network nodes over S1. The handover mechanism can also be handled via the S1 interfaces forwarded by the MME. The following discussion is based on a basic handover scenario in which neither MME nor S-GW changes due to the handover. See 3GPP TS 36.300 for more details.

In referring to FIG. 4, control plane steps involved in a basic handover scenario include:
1 The source eNB configures the UE measurement procedures.
2 The UE is triggered to send MEASUREMENT REPORT by the rules set by, e.g., system information, specification, etc.
3 The source eNB makes the decision based on MEASUREMENT REPORT and RRM information to hand off the UE.
4 The source eNB issues a HANDOVER REQUEST message to the target eNB passing necessary information to prepare the handover at the target side
5 Admission Control may be performed by the target eNB.
6 The target eNB prepares HO with L1/L2 and sends the HANDOVER REQUEST ACKNOWLEDGE to the source eNB. The HANDOVER REQUEST ACKNOWLEDGE message includes a transparent container with mobilityControlInformation to be sent to the UE as an RRC message to perform the handover. The HANDOVER REQUEST ACKNOWLEDGE message includes an Information Element (IE) called "Target eNB to Source eNB Transparent Container". This IE basically contains the handover command message (RRCConnectionReconfiguration that includes the mobilityControlInfo IE) that is sent to the UE in the next step.
  NOTE: As soon as the source eNB receives the HANDOVER REQUEST ACKNOWLEDGE, or as soon as the transmission of the handover command is initiated in the downlink, user plane data forwarding may be initiated.
7 The source eNB sends the RRC message to the UE to perform the handover, e.g., an RRCConnectionReconfiguration message including the mobilityControlInfo, which was received in the transparent container included in the HANDOVER REQUEST ACKNOWLEDGE sent from the target.
8 The source eNB sends the SN STATUS TRANSFER message to the target eNB.
9 After receiving the RRCConnectionReconfiguration message including the mobilityControlInformation, the UE performs synchronization with target eNB and accesses the target cell via RACH (Random Access Channel).

10 The target eNB responds with a UL allocation and a timing advance.

11 When the UE has successfully accessed the target cell, the UE sends the RRCConnectionReconfiguration-Complete message (C-RNTI) to the target eNB to confirm the handover. The target eNB begins sending data to the UE.

12 The target eNB sends a PATH SWITCH REQUEST message to the MME to inform that the UE has changed cell.

13 The MME sends a MODIFY BEARER REQUEST message to the Serving Gateway.

14 The Serving Gateway switches the downlink data path to the target side. The Serving gateway sends one or more "end marker" packets on the old path to the source eNB and releases any U-plane/TNL resources towards the source eNB.

15 The Serving Gateway sends a MODIFY BEARER RESPONSE message to the MME.

16 The MME confirms the PATH SWITCH REQUEST message with the PATH SWITCH REQUEST ACKNOWLEDGE message.

17 By sending the UE CONTEXT RELEASE message, the target eNB informs the source eNB of the success of the handover and triggers the release of resources by the source eNB.

18 Upon receiving the UE CONTEXT RELEASE message, the source eNB releases radio and C-plane related resources associated with the UE context. Any ongoing data forwarding may continue.

Intra-Frequency Neighbor Cell Measurements.

Handover candidates, such as eNBs or cells, are regularly monitored by UEs. A UE synchronizes with a neighbor cell candidate using synchronization signals and identifies a candidate cell using physical signal sequences that are associated with a physical cell identifier. Furthermore, the physical cell identifier of a cell is associated with a cell-specific reference sequence (pilot), from which a UE can estimate the reference symbol received power (RSRP). RSRP essentially is the average power of the reference sequence (pilot) symbols. In addition, a UE can determine the reference symbol received quality by dividing the RSRP by the total received power.

Random Access in LTE

Random access (RA) procedures serve as an uplink control procedure that grants UE access to the network.

A RA procedure serves two main purposes:

It lets a UE align its UL timing to the timing as expected by the eNB in order to minimize interference between transmissions of different UEs. UL time alignment is a requirement in E-UTRAN standards that needs to be satisfied before data transmissions by a UE can commence.

It provides a means for a UE to notify the network of its presence and for the eNB to grant the UE initial access to the system.

In addition to being used during initial access, RA procedures can also be used when a UE loses uplink synchronization or when a UE is in an idle or a low-power mode.

Figure 19:
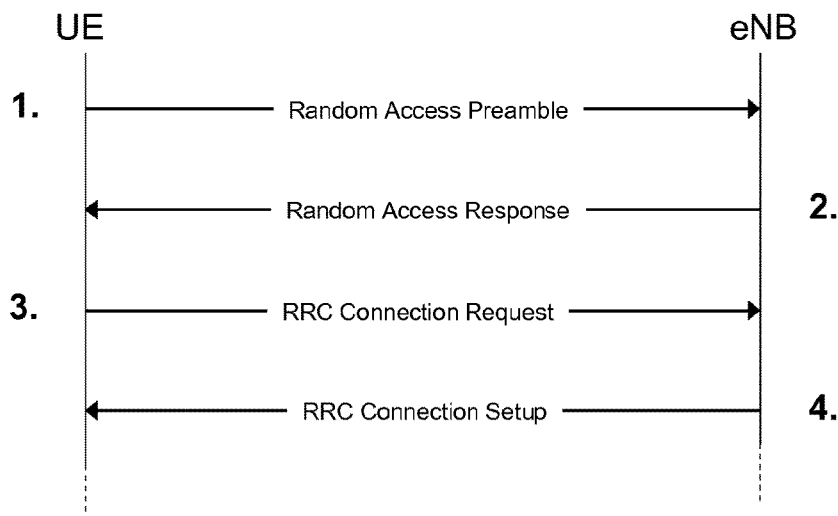
FIG. 19 illustrates different messages used in an exemplary random access procedure.

A basic RA procedure is a four-phase procedure as outlined in FIG. 19. The four phases are:

Phase 1 comprises transmission of a random access preamble by the UE, allowing the Node B to estimate the transmission timing of the UE. Uplink synchronization is necessary as the UE otherwise cannot transmit any uplink data.

Phase 2 comprises transmission by the network of a timing advance command to correct the uplink timing, based on the timing of arrival measurement in the first step. In addition to establishing uplink synchronization, the second step also assigns uplink resources and temporary identifier to the UE to be used in the third step in the random access procedure.

Phase 3 comprises signalling from the UE to the eNB. A primary function of this message is to uniquely identify the UE. The exact content of this signalling depends on the state of the UE, e.g., whether it is previously known to the network or not.

Phase 4, the final phase, is responsible for contention resolution in case multiple UEs tries to access the system on the same resource. In case of handover, it is possible to reserve a preamble in the mobilityControlInformation, which means that the UE is uniquely identified already after Phase 2.

Position Determination in LTE

In a LTE system, several different localization methods are available for determining the position of a UE.

The first localization method uses the network-assisted version of Global Navigation Satellite Systems (GNSSs) like the Global Positioning System (GPS) or Galileo. Different GNSSs can be used individually or in combination with other GNSSs. The network assists the UE GNSS receiver by providing assistance data (e.g., visible satellite list, clock corrections, reference positions) to reduce the UE GNSS start-up and acquisition times, to increase the UE GNSS sensitivity, and to allow the UE to consume less handset power than with stand-alone GNSS. The network-assisted GNSS methods rely on signaling between UE GNSS receivers and a continuously operating GNSS reference receiver network which has clear sky visibility of the same GNSS constellation as the assisted UE. With GNSS the highest accuracy can be achieved which meets the FCC requirements.

The second localization method is the Observed Time Difference Of Arrival (OTDOA) method. This method utilizes the differences of time measurements of downlink radio signals from at least three eNBs along with the knowledge of the geographical coordinates of the measured eNBs and their relative downlink timing for calculating the position of a UE. A Positioning Reference Signal (PRS) with a frequency reuse of six in combination with low-interference subframes (LIS) is also introduced in order to increase the visibility of the eNBs.

The third localization method, the enhanced cell ID positioning method, utilizes information about the serving cell and the knowledge of the geographical coordinates of the serving eNB for UE position estimation. Additional radio resource measurements like the Reference Signal Received Power (RSRP) or the Reference Signal Received Quality (RSRQ) can be used to improve UE location estimate. Also timing advance and AoA (Angle of Arrival) that are estimated proprietarily in a base station or an eNB can be considered for E-CID.

The fourth localization method determines how far a UE is located from a eNB. This method estimates the round-trip time between a mobile and its serving base station. LTE system is used as an example in the following discussion. Other radio access technologies apply as well.

Figure 20:
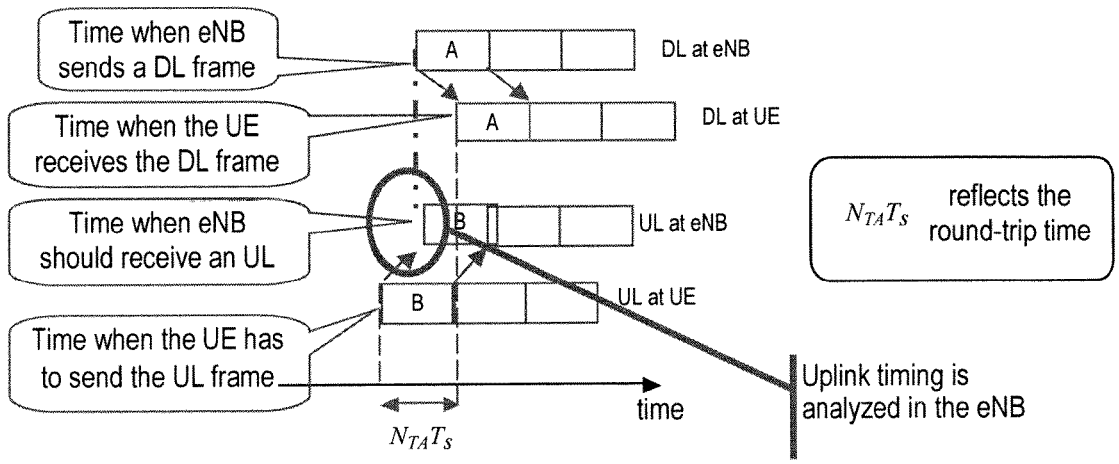
FIG. 20 illustrates an exemplary timing advance mechanism used in a LTE system.

It is specified in 3GPP TS 36.211 that "transmission of the uplink radio frame number from the UE shall start $N_{TA}T_s$ seconds before the start of the corresponding downlink radio frame at the UE", where $T_s$ is the LTE basic time unit, $T_s=1/(2048*15000)$ seconds. This is illustrated in FIG. 20.

The first uplink timing correction is sent from the eNB to the mobile during random access, to give the mobile the initial uplink timing. From then and onwards, adequate uplink timing is maintained by sending timing advance commands to the mobile. Timing advance commands are based on estimated uplink timing of the mobile as illustrated by FIG. 20.

Based on timing misalignment measurements Δt, the eNB sends quantized corrections to the mobile in step 1 (see below). The mobile updates its timing in step 2 (see below).

1 Quantization:

$$Q(\Delta t(k)) = \text{round}\left(\frac{\Delta t(k)}{16T_s}\right)$$

2 Timing update in the mobile: $N_{TA}(k+1)=N_{TA}(k)+16Q(\Delta t(k))$

There are two alternative ways of estimating the round-trip time between a mobile and an eNB. One alternative is using the timing advanced commands. The quantized timing misalignment measurements are tallied also on the base station side to form an estimate of RTT:

$N_{TA}(k+1)=N_{TA}(k)+16Q(\Delta t(k))$ $R\hat{T}T(k+1)=N_{TA}(k+1)T_s$

The accuracy of the RTT estimate using the above equation is mainly limited by the quantization, which means that a representative RTT distribution is uniform with a width of $16T_s$:

$p(R\hat{T}T(k+1))=U(R\hat{T}T(k+1)-8T_s, R\hat{T}T(k+1)+8T_s)$

The second alternative is using timing misalignment measurements. Quantization is needed to limit the signalling to the mobile. However, a more accurate misalignment measurement can also be considered to form an estimate of RTT:

$$N_{TA}(k+1) = N_{TA}(k) + 16Q(\Delta t(k))$$

$$\hat{N}_{TA}(k+1) = N_{TA}(k) + \frac{1}{T_s}(\Delta t(k))$$

$$R\hat{T}T(k+1) = \hat{N}_{TA}(k+1)T_s$$

In the second alternative, the accuracy of the estimated RTT is limited by the timing misalignment accuracy. One typical assumption is that the estimation error is zero-mean Gaussian with variance $\sigma_{misal}^2$. Thus, the RTT estimate distribution is given by:

$$p(RTT) = \frac{1}{\sigma_{misal}\sqrt{2\pi}}e^{-(RTT-R\hat{T}T(k+1))^2/2/\sigma_{misal}}$$

Moreover, the RTT can also be expressed as:

$R\hat{T}T_i = 2|p_m - p_i|/c + w_i.$

In summary, different positioning methods are described in the above section. A hybrid positioning method incorporating multiple positioning methods introduced above can be also supported. The position information of a UE may be reported together with the estimated errors (uncertainty) of the position estimate and the velocity of the UE. The uncertainty of the position information depends on the used method used, the position of the UE within the coverage area, and the activity of the UE.

Movement Determination in LTE

Direction of Departure Estimation

Direction of departure estimation based on downlink signals determines the angle of a mobile's movement as viewed from the base station's perspective with respect to a certain reference. One typical reference is a compass that designates north as 0 degree and increases clockwise to 360 degrees when it is once again north. Another exemplary reference uses complex numbers, using 0 degree to designate the positive real axis and increasing counter-clockwise up to 180 degrees when reaching the negative positive axis and decreasing clockwise to −180 degrees when reaching the negative positive axis. Note that the angle of arrival as observed by the mobile is the direction of departure observed at the base station plus a 180 degree offset.

Basic Method:

One basic direction of departure estimation method uses the beam direction of a serving cell. Assuming that the mobile is always within an angular range half way to neighboring cells at the same site, the estimation error distribution would be uniform within that range.

Subspace Methods:

Direction of departure estimation is most commonly done at a base station equipped with multiple antennas and often relies on coherent combination of per-antenna received signals. Popular approaches include subspace methods for frequency estimation, where the signal space and the noise space are separated—each spanned by eigen-vectors associated with corresponding singular values. Another popular approach is MUSIC (MUltiple SIgnal Classification) based on a direct singular value decomposition, ESPRIT (Estimation Of Signal Parameters via Rotational Invariance Techniques).

The Basics of Received Signal Strength Methods

These methods can also be used with less detailed information such as received signal strengths and antenna information.

The received signal strength pR (RSRP in LTE) can be expressed as $p_R = p_T + g_L + g_A + g_P + \omega$ where $p_T$—transmitted pilot power,
$g_L$—gain (<0) due to losses due to feeder cables etc,
$g_A$—antenna gain (typically >0),
$g_P$—propagation gain (<0),
w—measurement noise.

Figure 21:
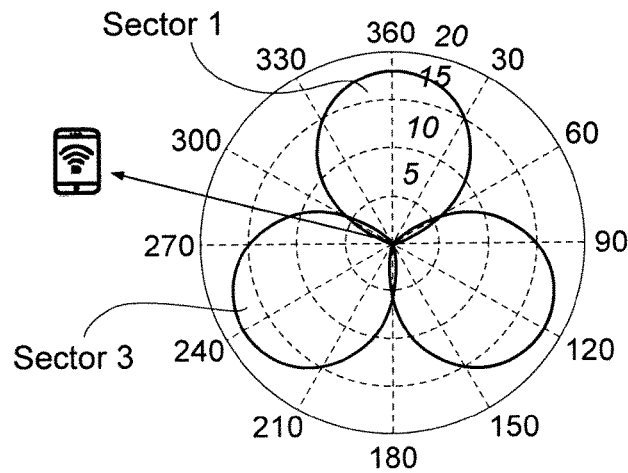
FIG. 21 illustrates two received signal strengths associated with signals from different sectors.

FIG. 21 illustrates the situation for a specific direction to a mobile receiving signals from sectors at the same site.

A reasonable assumption is that the propagation gain from two sectors at the same site is the same. Furthermore, the pilot powers and losses in the tower are either equal considering two different sectors at the same site, or the difference is known. Without loss of generality, it is assumed that the pilot power and the tower losses are the same. This means that the difference between the received signal strengths from two different sectors at the same site as $p_{R1} - p_{R3} = p_T + g_L + g_{A1} + g_P + \omega_1 - p_T - g_L - g_{A3} - g_P\omega_2 = g_{A1} - g_{A3} + \omega_1 - \omega_3$ Hence, the received signal strength difference is equal to the antenna gain difference plus noise. If the noise per measured sector is considered independent and of variance $\sigma^2_{RSS}$, the received signal strength difference is subject to noise with variance $2\sigma^2_{RSS}$. This means that with known antenna information, it is possible to match a reported received signal strength difference to a direction of departure corresponding to the reported difference. See PCT/SE2011/051226 for further details.

Estimating Velocity Using Doppler Estimation:

If the mobile is moving at a velocity v relative to the serving base station, the base station receiver will observe a shift in carrier frequency $f_c$, such that the received frequency $f_r$ is either lower (mobile is moving away from the base station) or higher (mobile is moving towards the base station) than the carrier frequency. The differences can be used to estimate the relative velocity v with respect to the base station:

$$f_r = \frac{1}{1 + \frac{v}{c}} f_c.$$

More details can be found in U.S. Pat. No. 6,873,852, which is incorporated here by reference.

The invention claimed is:

1. A method performed by a base station in a wireless communication system, the base station being associated with a User Equipment (UE) group comprising UEs having correlated mobility related parameters, the method comprising:
   receiving, by the base station, from a first UE in the UE group, a mobility related parameter associated with the first UE;
   determining, by the base station, whether to initiate a mobility related procedure for a second UE in the UE group based on the received mobility related parameter; and
   initiating the mobility related procedure for the second UE, towards a cell selected by the base station based on the cell having been reported to the base station as being a neighbor cell by the largest number of UEs in the group, when it is determined that the mobility related procedure is to be performed.

2. The method of claim 1, wherein the determining comprises determining whether to initiate a mobility related procedure for the UE based on the received mobility related parameter and applying the result on the second UE belonging to the same group.

3. The method of claim 1, wherein the mobility related procedure is a handover procedure.

4. The method of claim 1, wherein the initiating comprises transmitting a handover request to a target network node.

5. The method of claim 1, wherein the mobility related parameter is at least one of:
   a report of a measured signal strength at the first UE;
   a report of a measurement on a signal received by the first UE from a neighboring base station;
   information on the geographical position of the first UE;
   a report of a measurement on a signal received by the first UE from an access point in another wireless communication system.

6. The method of claim 1:
   further comprising receiving a respective mobility related parameter associated with a number of other UEs in the UE group;
   wherein the initiating of the mobility related procedure is further based on a received number of mobility related parameters.

7. The method of claim 1, wherein the mobility related procedure is initiated for a plurality of UEs in the UE group, the plurality comprising the second UE.

8. The method of claim 1, wherein the mobility related procedure is initiated for the whole UE group.

9. The method of claim 1, wherein the initiating comprises using a single mobility command for a plurality of UEs in the UE group.

10. A base station operable in a wireless communication system and further operable to be associated with a User Equipment (UE) group comprising UEs having correlated mobility related parameters, the base station comprising:
   one or more processing circuits configured to function as:
      a receiving circuit, in the base station, configured to receive, from each of a plurality of UEs in the UE group, a mobility related parameter associated with the plurality of UEs;
      a determining circuit, in the base station, configured to determine whether to initiate a mobility related procedure for a UE different from the plurality of UEs in the UE group based on the received mobility related parameters from the plurality of UEs;
      a mobility control circuit, in the base station, configured to initiate the mobility related procedure for the UE different from the plurality of UEs, towards a cell selected by the base station based on the cell having been reported to the base station as being a neighbor cell by the largest number of UEs in the UE group, when it is determined that the mobility related procedure is to be performed.

11. The base station of claim 10, wherein the determining circuit is configured to:
   determine whether to initiate the mobility related procedure for the plurality of UEs based on the received mobility related parameter; and
   apply the result on the UE different from the plurality of UEs belonging to the same group.

12. The base station of claim 10, wherein the mobility related procedure is a handover procedure.

13. The base station of claim 10, wherein mobility control circuit configured to initiate the mobility related procedure by transmitting a handover request to a target network node.

14. The base station of claim 10, wherein the mobility related parameter is at least one of:
   a report of a measured signal strength at the plurality of UEs;
   a report of a measurement on a signal received by the plurality of UEs from a neighboring base station;
   information on the geographical position of the plurality of UEs;
   a report of a measurement on a signal received by the plurality of UEs from an access point in another wireless communication system.

15. The base station of claim 10:
   wherein the base station is further configured to receive a respective mobility related parameter associated with a number of other UEs in the UE group;
   wherein the mobility control circuit configured to initiate the mobility related procedure further based on the received number of mobility related parameters.

16. The base station of claim 10, wherein the mobility control circuit configured to initiate the mobility related procedure for a plurality of UEs in the UE group, the plurality comprising the UEs different from the plurality of UEs belonging to the same group.

17. The base station of claim 10, wherein the mobility control circuit configured to initiate the mobility related procedure for the whole UE group.

18. The base station of claim 10, wherein the mobility control circuit configured to initiate the mobility related procedure using a single mobility command for a plurality of UEs in the UE group.

19. A computer program product stored in a non-transitory computer readable medium for controlling a base station in a wireless communications system, the base station being associated with a User Equipment (UE) group comprising UEs having correlated mobility related parameters, the computer program product comprising software instructions which, when run on one or more processing circuits of the base station, cause the base station to:
  receive, by the base station, from each of a plurality of UEs in the UE group, a mobility related parameter associated with the plurality of UEs;
  determine, by the base station, which cell is reported as being a neighbor cell by the largest number of the plurality of UEs in the UE group based on the received mobility related parameter;
  initiate, by the base station, a mobility related procedure for the UE group towards the determined cell when it is determined that the mobility related procedure is to be performed based on the received mobility related parameter associated with each of the plurality of UEs.

* * * * *